United States Patent
Shapiro et al.

(10) Patent No.: US 10,496,070 B2
(45) Date of Patent: Dec. 3, 2019

(54) MOVING MATERIAL DURING LASER FABRICATION

(71) Applicant: GLOWFORGE, INC., Seattle, WA (US)

(72) Inventors: Daniel Shapiro, Seattle, WA (US); Mark Gosselin, Seattle, WA (US); Anthony Wright, Seattle, WA (US); Dean Putney, Seattle, WA (US); Timothy Ellis, Seattle, WA (US); Lauren Banka, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 344 days.

(21) Appl. No.: 15/334,104

(22) Filed: Oct. 25, 2016

(65) Prior Publication Data
US 2017/0235293 A1 Aug. 17, 2017

Related U.S. Application Data

(63) Continuation of application No. PCT/US2016/017901, filed on Feb. 12, 2016.
(Continued)

(51) Int. Cl.
*G05B 19/402* (2006.01)
*G05B 19/18* (2006.01)
(Continued)

(52) U.S. Cl.
CPC .......... *G05B 19/402* (2013.01); *B23K 10/006* (2013.01); *B23K 26/032* (2013.01);
(Continued)

(58) Field of Classification Search
CPC ............... G05B 19/402; G05B 19/406; G05B 2219/31186; G05B 2219/32001;
(Continued)

(56) References Cited

U.S. PATENT DOCUMENTS 3,721,811 A  3/1973 Taylor et al.
3,967,176 A  6/1976 Wagener et al.
(Continued)

FOREIGN PATENT DOCUMENTS

CN  101095033 A  12/2007
CN  101733558 A  6/2010
(Continued)

OTHER PUBLICATIONS

Dazhong Wu et al. "Cloud Manufacturing: Drivers, Current Status, and Future Trends." vol. 2. Systems; Micro and Nano Technologies Sustainable Manufacturing. Jun. 10, 2013. Retrieved on May 10, 2016. pp. 1-10.
(Continued)

*Primary Examiner* — Brian W Wathen
*Assistant Examiner* — Alicia M. Choi
(74) *Attorney, Agent, or Firm* — Mintz Levin Cohn Ferris Glovsky and Popeo, P.C.

(57) ABSTRACT

A moveable head of a computer numerically controlled machine may deliver electromagnetic energy sufficient to cause a first change in a material at least partially contained within an interior space of the CNC machine. A feature of the material may be imaged using at least one camera present inside the interior space to update a position of the material, and the moveable head may be aligned to deliver electromagnetic energy sufficient to cause a second change in the material such that the second change is positioned on the material consistent with the first change and with an intended final appearance of the material. Methods, systems, and article of manufacture are described.

22 Claims, 24 Drawing Sheets

Related U.S. Application Data

(60) Provisional application No. 62/222,756, filed on Sep. 23, 2015, provisional application No. 62/222,757, filed on Sep. 23, 2015, provisional application No. 62/222,758, filed on Sep. 23, 2015, provisional application No. 62/115,571, filed on Feb. 12, 2015, provisional application No. 62/115,562, filed on Feb. 12, 2015.

(51) Int. Cl.

| | | |
|---|---|---|
| *B23K 10/00* | (2006.01) | |
| *B23Q 17/22* | (2006.01) | |
| *G05B 19/406* | (2006.01) | |
| *B23K 37/02* | (2006.01) | |
| *B23K 26/03* | (2006.01) | |
| *B23K 26/08* | (2014.01) | |
| *B23K 26/38* | (2014.01) | |
| *B23K 37/04* | (2006.01) | |
| *B23K 26/082* | (2014.01) | |
| *B33Y 50/00* | (2015.01) | |
| *B29C 64/386* | (2017.01) | |

(52) U.S. Cl.
CPC ............ *B23K 26/08* (2013.01); *B23K 26/082* (2015.10); *B23K 26/0853* (2013.01); *B23K 26/0876* (2013.01); *B23K 26/38* (2013.01); *B23K 37/0211* (2013.01); *B23K 37/0235* (2013.01); *B23K 37/0408* (2013.01); *B23Q 17/22* (2013.01); *G05B 19/18* (2013.01); *G05B 19/406* (2013.01); *B29C 64/386* (2017.08); *B33Y 50/00* (2014.12); *G05B 2219/31186* (2013.01); *G05B 2219/32001* (2013.01); *G05B 2219/36053* (2013.01); *G05B 2219/36199* (2013.01); *G05B 2219/37359* (2013.01); *G05B 2219/37555* (2013.01); *G05B 2219/42307* (2013.01); *G05B 2219/45041* (2013.01); *G05B 2219/45212* (2013.01); *Y02P 80/40* (2015.11); *Y02P 90/86* (2015.11)

(58) Field of Classification Search
CPC ........... G05B 2219/36053; G05B 2219/36199; G05B 2219/37359; G05B 2219/37555; G05B 2219/42307; G05B 2219/45041; G05B 2219/45212; B23K 26/082; B23K 26/032; B23K 26/08; B23K 26/0853; B23K 26/0876; B23K 26/38; B23K 37/0211; B23K 37/0235; B23K 37/0408; G01B 11/24; B33Y 50/00; Y02P 80/40; B29C 64/386
USPC ........................................................ 700/166
See application file for complete search history.

(56) References Cited

U.S. PATENT DOCUMENTS

| | | | |
|---|---|---|---|
| 4,055,787 A | 10/1977 | Beadle et al. | |
| 4,138,718 A | 2/1979 | Toke et al. | |
| 4,650,287 A | 3/1987 | Kudo et al. | |
| 4,723,219 A | 2/1988 | Beyer et al. | |
| 4,901,359 A | 2/1990 | Bruder | |
| 4,918,611 A | 4/1990 | Shyu et al. | |
| 5,298,843 A | 3/1994 | Miyajima et al. | |
| 5,396,279 A * | 3/1995 | Vossen ................... B25J 9/1697 348/88 |
| 5,756,961 A | 5/1998 | Sato et al. | |
| 6,031,200 A | 2/2000 | Whitehouse | |
| 6,609,044 B1 | 8/2003 | Basista et al. | |
| 6,628,322 B1 | 9/2003 | Cerruti | |
| 8,111,904 B2 | 2/2012 | Wallack et al. | |
| 8,136,432 B2 | 3/2012 | Travez et al. | |
| 8,809,780 B2 | 8/2014 | Wollenhaupt et al. | |
| 9,020,628 B2 | 4/2015 | Fagan | |
| 9,235,205 B2 | 1/2016 | Prestidge et al. | |
| 9,469,338 B2 | 10/2016 | Norberg Ohlsson | |
| 9,618,926 B1 | 4/2017 | Louette et al. | |
| 9,734,419 B1 | 8/2017 | Ye et al. | |
| 9,912,915 B2 * | 3/2018 | Sinclair ................... G06T 19/20 |
| 9,987,798 B2 | 6/2018 | Tyler | |
| 10,234,260 B2 | 3/2019 | Siercks et al. | |
| 2001/0012973 A1 | 8/2001 | Wehrli et al. | |
| 2002/0129485 A1 | 9/2002 | Mok et al. | |
| 2003/0049373 A1* | 3/2003 | Van De Rijdt ....... B05C 5/0212 427/248.1 |
| 2004/0207831 A1 | 10/2004 | Aoyama | |
| 2004/0223165 A1 | 11/2004 | Kurokawa et al. | |
| 2005/0051523 A1* | 3/2005 | Legge ..................... B23K 26/04 219/121.83 |
| 2005/0069682 A1 | 3/2005 | Tseng | |
| 2005/0071020 A1 | 3/2005 | Yamazaki et al. | |
| 2005/0115941 A1 | 6/2005 | Sukhman et al. | |
| 2005/0187651 A1 | 8/2005 | Kimura et al. | |
| 2008/0149604 A1 | 6/2008 | Varriano-Marston et al. | |
| 2008/0160254 A1 | 7/2008 | Arnold | |
| 2008/0243299 A1 | 10/2008 | Johnson et al. | |
| 2008/0249653 A1 | 10/2008 | Ichikawa | |
| 2009/0250445 A1 | 10/2009 | Yamaguchi et al. | |
| 2010/0063603 A1 | 3/2010 | Chandhoke | |
| 2010/0081971 A1 | 4/2010 | Allison | |
| 2010/0149337 A1* | 6/2010 | Porcino .............. H04N 5/23203 348/159 |
| 2010/0193482 A1 | 8/2010 | Ow et al. | |
| 2010/0274379 A1 | 10/2010 | Hehl | |
| 2010/0301023 A1 | 12/2010 | Unrath et al. | |
| 2011/0127333 A1* | 6/2011 | Veksland ........... G06K 7/10722 235/462.24 |
| 2011/0193943 A1* | 8/2011 | Campbell ............ F16M 11/045 348/46 |
| 2011/0316977 A1 | 12/2011 | Pienaar | |
| 2012/0035745 A1 | 2/2012 | Mori et al. | |
| 2012/0117787 A1 | 5/2012 | Sun et al. | |
| 2012/0197427 A1 | 8/2012 | Gallucci et al. | |
| 2012/0293821 A1 | 11/2012 | Chiba | |
| 2013/0158957 A1 | 6/2013 | Lee et al. | |
| 2013/0190898 A1 | 7/2013 | Shilpiekandula et al. | |
| 2013/0200053 A1 | 8/2013 | Bordatchev | |
| 2013/0304248 A1 | 11/2013 | Lange et al. | |
| 2014/0005804 A1 | 1/2014 | Brand | |
| 2014/0018779 A1* | 1/2014 | Worrell ............... G06F 19/3418 606/1 |
| 2014/0039707 A1 | 2/2014 | Curtis et al. | |
| 2014/0071330 A1* | 3/2014 | Zhang ................... H04N 5/2258 348/345 |
| 2014/0071502 A1* | 3/2014 | Liu ....................... H04N 1/1077 358/498 |
| 2014/0160273 A1 | 6/2014 | Jedynak et al. | |
| 2014/0310122 A1 | 10/2014 | Danielson et al. | |
| 2015/0107033 A1 | 4/2015 | Chang et al. | |
| 2015/0108095 A1 | 4/2015 | Kruer et al. | |
| 2015/0112470 A1 | 4/2015 | Chang et al. | |
| 2015/0212421 A1 | 7/2015 | deVilliers et al. | |
| 2015/0245549 A1 | 8/2015 | Kurita et al. | |
| 2015/0355621 A1 | 12/2015 | Ikeda et al. | |
| 2016/0084649 A1* | 3/2016 | Yamazaki ............... G01S 17/08 348/139 |
| 2016/0147213 A1 | 5/2016 | Murakami | |
| 2016/0156771 A1 | 6/2016 | Lee | |
| 2016/0199945 A1 | 7/2016 | McDowell et al. | |
| 2016/0210737 A1 | 7/2016 | Straub et al. | |
| 2016/0271718 A1 | 9/2016 | Fagan | |
| 2016/0303845 A1 | 10/2016 | Arce | |
| 2016/0325541 A1 | 11/2016 | Lavrentyev et al. | |
| 2017/0045877 A1 | 2/2017 | Shapiro et al. | |
| 2017/0045879 A1 | 2/2017 | Yang et al. | |
| 2017/0235294 A1 | 8/2017 | Shapiro et al. | |
| 2018/0113434 A1 | 4/2018 | Shapiro et al. | |

(56) References Cited

U.S. PATENT DOCUMENTS

FOREIGN PATENT DOCUMENTS

| DE | 10 2014 214058 A1 | 1/2016 |
|----|-------------------|--------|
| EP | 2471625 A2 | 7/2012 |
| EP | 2808123 A1 | 12/2014 |
| JP | H03 254380 A | 11/1991 |
| JP | 04244347 A | 9/1992 |
| JP | 2002123306 A | 4/2002 |
| WO | WO-94/03302 A1 | 2/1994 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Gao, Rong et al. "Human-Machine Collaborative Workshop Digital Manufacturing." *ICICTA. 2010 IEEE*. May 11, 2010. pp. 445-448.

\* cited by examiner

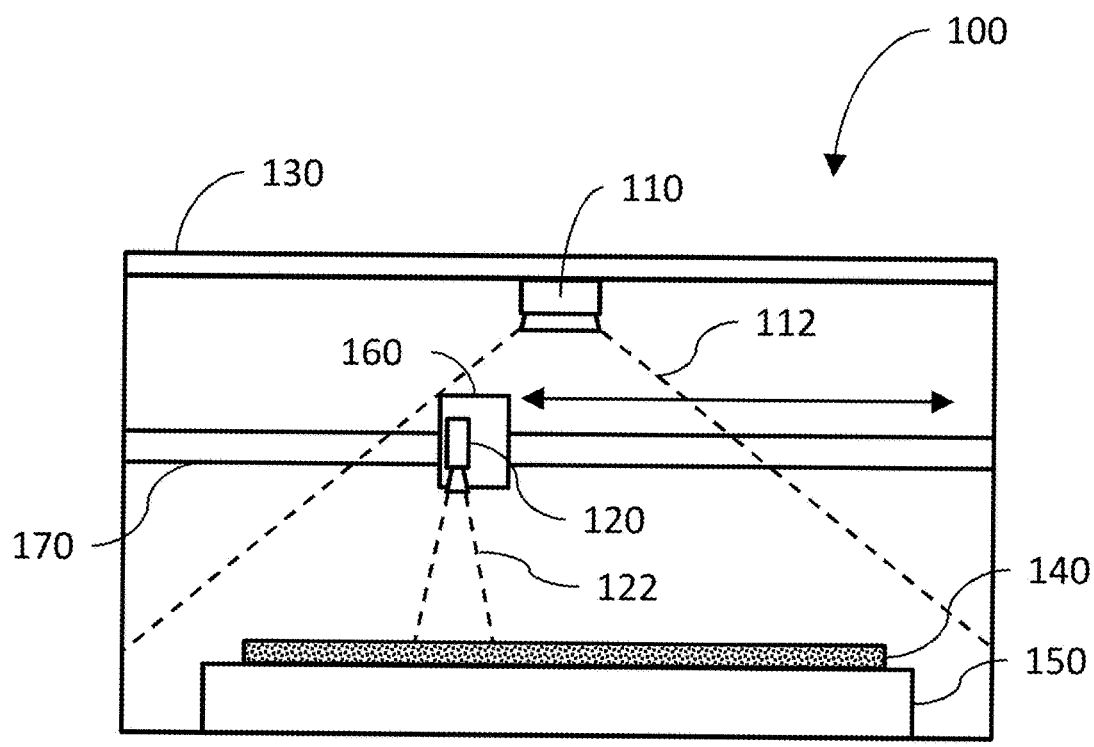
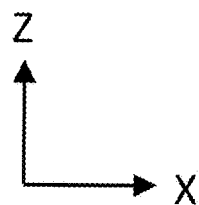
Fig. 1

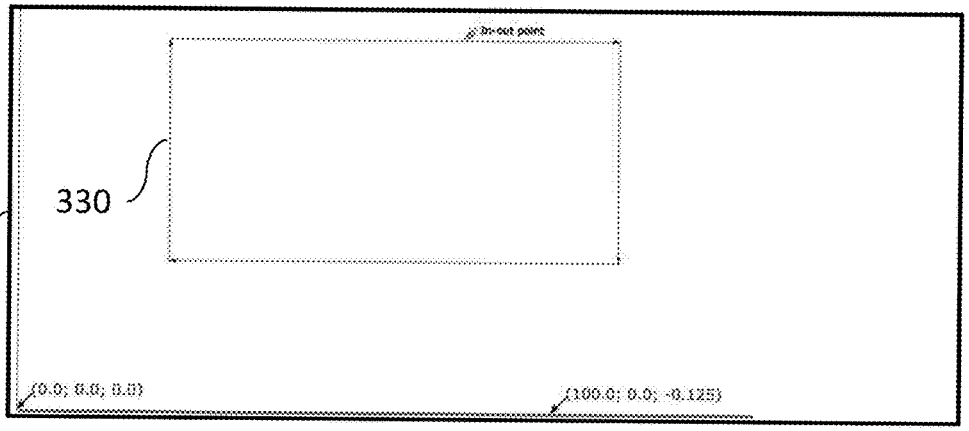

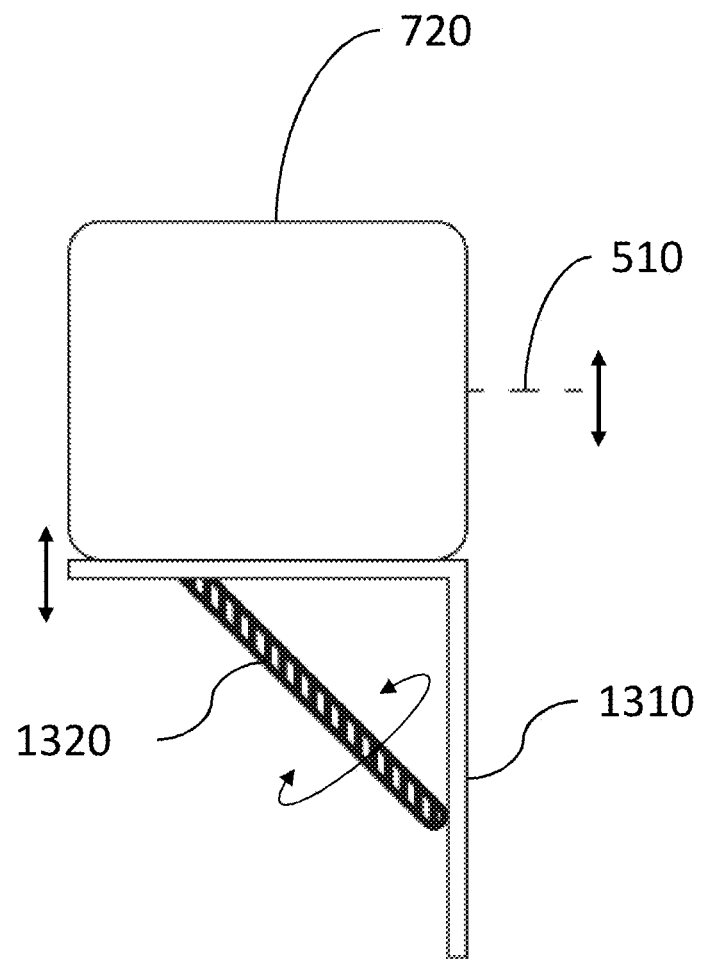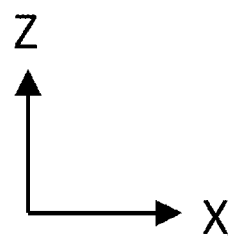
Fig. 13

MOVING MATERIAL DURING LASER FABRICATION

CROSS-REFERENCE TO RELATED APPLICATIONS

The current application is related to/claims priority under 35 U.S.C. § 119 to International Application No.: PCT/US16/017901 filed Feb. 12, 2016, which claims priority under PCT Article 8 to U.S. Provisional Patent Application No. 62/115,562 filed Feb. 12, 2015; U.S. Provisional Patent Application No. 62/115,571 filed Feb. 12, 2015; U.S. Provisional Patent Application No. 62/222,756 filed Sep. 23, 2015; U.S. Provisional Patent Application No. 62/222,757 filed Sep. 23, 2015; and U.S. Provisional Patent Application No. 62/222,758 filed Sep. 23, 2015. The written description, claims, and drawings of all of the aforementioned applications are incorporated herein by reference.

TECHNICAL FIELD

The subject matter described herein relates to manufacturing processes implementing, or aided by, machine vision and incorporating moving material inside the manufacturing machine.

BACKGROUND

Manufacturing systems, such as "3-D" printers, laser cutters, CNC machines, and the like, can be used to create complicated items where traditional manufacturing techniques like moldings or manual assembly fail. Such automated methods receive instructions that specify the cuts, layers, patterns, etc. before a machine begins construction. The instructions can be in the form of computer files transferred to the memory of a computer controller for the machine and interpreted at run-time to provide a series of steps in the manufacturing process.

SUMMARY

In one aspect, a method delivers, via a moveable head of a computer numerically controlled machine, electromagnetic energy sufficient to cause a first change in a material partially contained within an interior space of the computer numerically controlled machine. A feature of the material is imaged using at least one camera present inside the interior space to update a position of the material. The movable head is aligned to deliver electromagnetic energy sufficient to cause a second change in the material such that the second change is positioned on the material consistent with the first change and with an intended final appearance of the material.

In a second aspect, a computer numerically controlled machine includes a moveable head inside an interior space of the computer numerically controlled machine, where the moveable head is configured to deliver electromagnetic energy. There is a camera present inside the interior space. There is a controller configured to perform operations including: causing the moveable head to deliver first electromagnetic energy sufficient to cause a first change in a material at least partially contained within the interior space, commanding the camera to image a feature of the material to update a position of the material, and causing alignment of the moveable head to deliver electromagnetic energy sufficient to cause a second change in the material such that the second change is positioned on the material consistent with the first change and with an intended final appearance of the material.

In some variations one or more of the following features can optionally be included in any feasible combination. The feature can include the first change, an aspect of an appearance of the material prior to the first change, a corner of, a hole in, and/or an edge of the material, a fiducial mark made on the material.

The camera can include a camera mounted on the moveable head, a camera not mounted on the moveable head, a camera mounted on an openable barrier of a housing that at least partially defines the interior space.

It can be determined that, based on information from the camera, that an additional image of the material should be captured. The material can be imaged a second time to capture the at least one additional image.

The different position can result from an intentional movement of the material by a user and/or a device associated with the computer numerically controlled machine. The different position can result from an unintentional movement of the material.

It can be determined that the unintentional movement may have occurred based on data from sensors of the computer numerically controlled machine.

The material can be moved through a pass-through slot in a housing that at least partially defines the interior volume.

The camera can include a first camera and a second camera, where the imaging includes moving the second camera to facilitate further imaging of the material based information from an image produced by the first camera. The image can include a view of the feature, and the further imaging includes generating a higher-resolution image and/or closer-up image of the feature. The feature can include a corner of the material. The first camera can be mounted on an openable barrier of a housing that partially defines the interior space, and the second camera is mounted on the moveable head.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is an elevational view of a CNC machine with a camera positioned to capture an image of the entire material bed and another camera positioned to capture an image of a portion of the material bed, consistent with some implementations of the current subject matter;

FIG. 3A is a diagram illustrating one example of an SVG source file, consistent with some implementations of the current subject matter;

FIG. 3B is an example of a graphical representation of the cut path in the CNC machine, consistent with some implementations of the current subject matter;

FIG. 3C is a diagram illustrating the machine file corresponding to the cut path and the source file, consistent with some implementations of the current subject matter;

FIG. 13 is a front sectional view of a cantilevered angularly adjustable turning system, consistent with some implementations of the current subject matter;

When practical, similar reference numbers denote similar structures, features, or elements.

DETAILED DESCRIPTION

Figure 2:
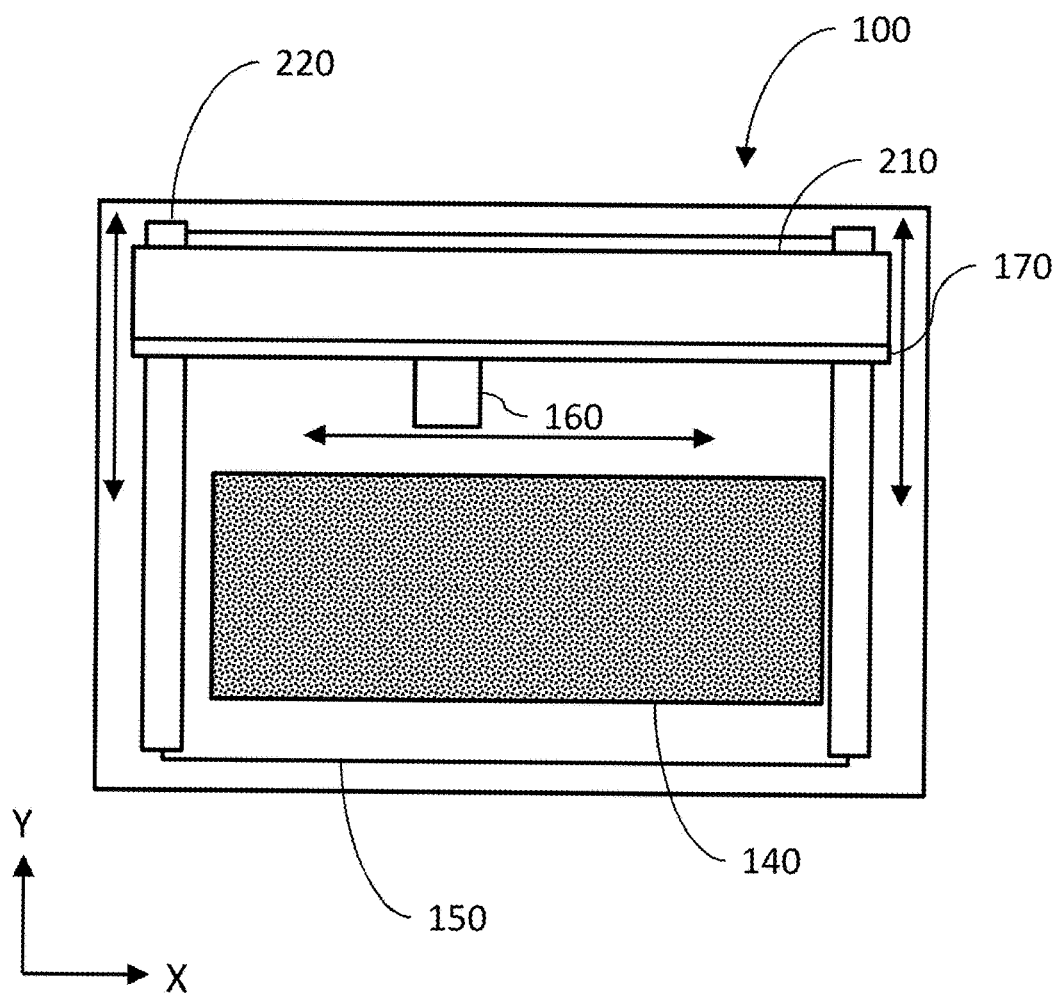
FIG. 2 is a top view of the implementation of the CNC machine shown in FIG. 1.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
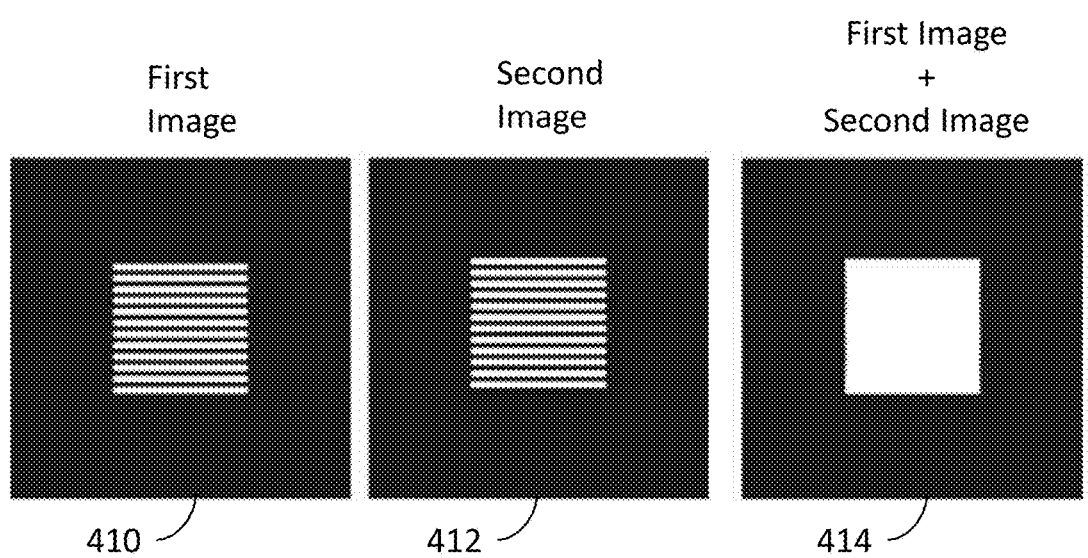
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
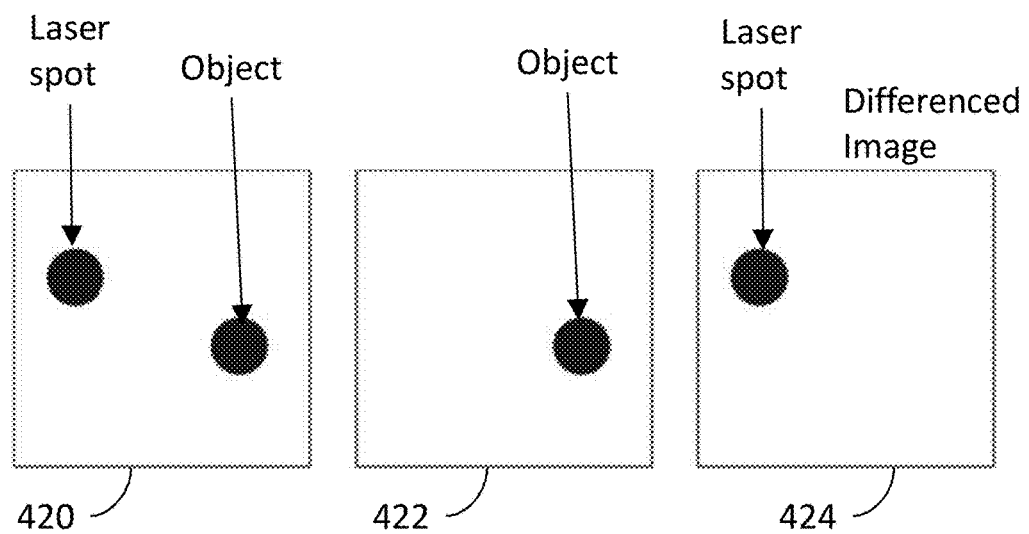
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
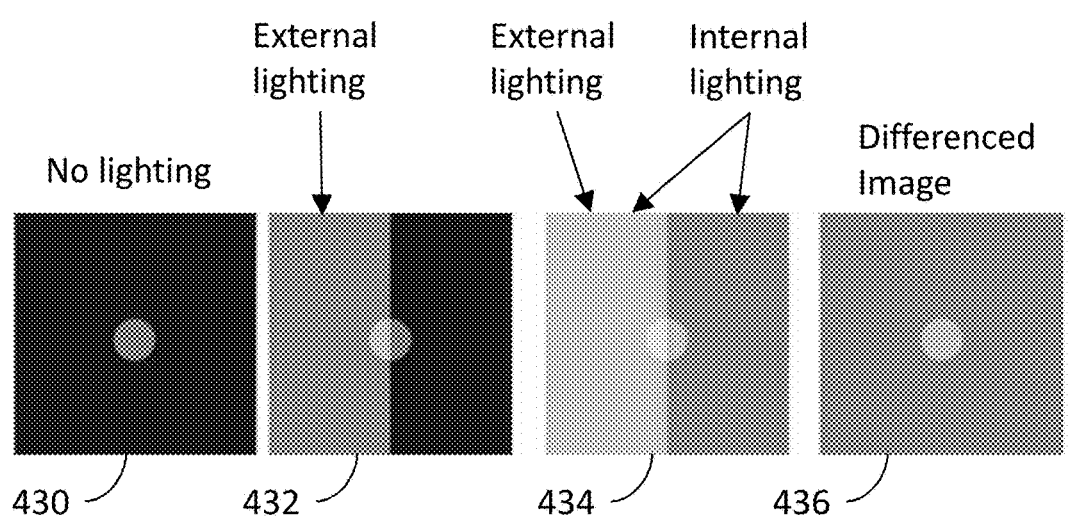
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illuminated by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $1/60^{th}$ of a second, or less than $1/120^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Laser Head

Figure 5:
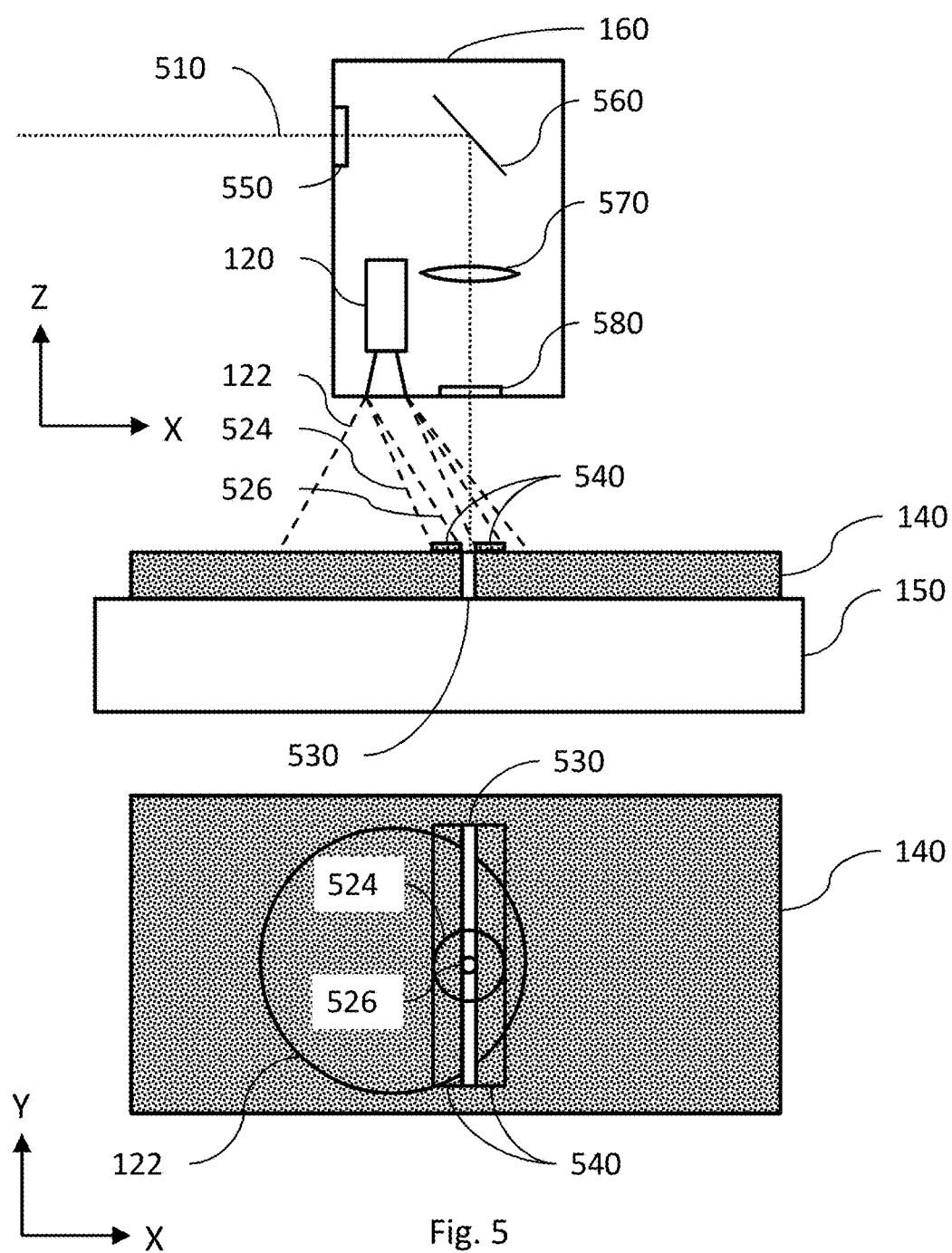
FIG. 5 is a diagram illustrating a camera providing high-resolution images of the material in a CNC machine, consistent with some implementations of the current subject matter.

FIG. 5 is a diagram illustrating a camera providing high-resolution images of the material 140 in a CNC machine 100, consistent with some implementations of the current subject matter. Cameras on or near the head 160, or cameras mounted anywhere in the CNC machine 100 and focused to image a narrow field of view around a cut location, can provide high-resolution images. The example shown in FIG. 5 corresponds to a head 160 in an implementation where the CNC machine 100 is a laser cutter. Here, the head 160 can include several optical components, including one or more windows 550, 580 to allow entrance or exit of a laser beam 510, one or more mirrors 560 for directing the laser beam 510, one or more lenses 570 for focusing the laser beam 510, etc.

The head camera 120, here shown mounted to the head 160, can have an overall field of view 122. The overall field of view 122, as illustrated in FIG. 5, can include one or more cuts. The volume of the cut is herein referred to here as an output volume 530. Similarly, there can be a peripheral volume 540 proximate to the cut, and a portion of the material 140. The overall field of view 122 thus can include two additional fields of view that correspond to the above features. The overall field of view 122 can include an output field of view 326 viewing the output volume 530 and a peripheral field of view 524 viewing the peripheral volume 540.

The output volume 530 can correspond to the output of the CNC machine 100. The output volume 530, in the example of a laser cutter, can be the volume (or portion thereof) of a cut made by the CNC machine 100. In the example of a 3-D printer, the output volume 530 can correspond to the "tube" (or portion thereof) of material 140 that the CNC machine 100 deposits. In yet another example, if the CNC machine 100 is an inkjet printer, the output volume 330 can correspond to a portion of the ink that is deposited on the surface of the material 140.

Similarly, the peripheral volume 540 can include a region proximate to the output volume 540 where additional effects from operation of the CNC machine 100 can occur. In the example of a laser cutter, the peripheral volume 540 can include a debris field, the extent of burning or discoloration of the material 140 that results from the cutting, etc.

By analyzing, with an image analysis program, image data acquired by the head camera 120, conditions can be identified that correspond to the output volume 530 or the peripheral volume 540. Many examples of such conditions are described in further detail herein, however one example can be determining the present cut depth and adjusting the laser to change or correct the cut depth. In this way, instructions can be generated for the CNC machine 100 to provide a second, possibly different, output in response to the identified condition. The CNC machine 100 can then execute the instructions.

Conditions (or features) can also be identified from images within the fields of view of the head camera 120. These conditions or features can include, for example, inadequate lighting, shadows, reflections, obstructions, smoke, other previous cuts, registration marks, markings for tracing, etc. Many of these features, and their relationship to capabilities of the CNC machine 100, are described in greater detail throughout this application.

Interchangeable Heads

The head 160 can be detachable from the gantry 210 to allow the placement of other heads or attachments to be connected. Alternative heads can include, for example, a printer head such as an inkjet printer head, a drag knife head, a 3-D printer head, diode laser, plasma cutters, spindle, waterjet etc. The CNC machine 100 can also have appropriate connector ports as needed for operation of the alternative heads, for example, power, air, data, water, etc. The active portion of the alternative head (nozzle, cutting point) can be positioned at the same X-Y location on the head 160 as the active portion of the head 160 prior to changing (for example in a laser cutter, the location where the beam is directed to the material 140). The new head 160 can also be located at a different position relative to the old head 160, and machine vision alignment can be used to ensure that the gantry 210 and head 160 move to compensate and maintain alignment when using the new head 160. Once the alternative head is in place, the motion plan and/or acquired images can then be used to guide operations with the alternative head. The gantry 210 and/or heads 160 can also include position retaining fasteners to maintain the positioning of the heads 160 across interchanges. The position retaining fasteners can include, for example, magnets, slots, locks, screws, etc.

In the example of a laser cutter, the laser operation can configured to only work upon the detection of a specific type of head (for example a head configured to receive a laser beam). The laser can also be configured not to function when no head 160 is detected, or if the head 160 detected is not designed to work with the laser, for example if the head 160 is a different model, different type of head (inkjet, cutting knife), etc. Upon detection of a laser-incompatible head, for example a head designed to cut material by means of a razor blade, several actions must take place. First, and most importantly, the laser must be instructed not to fire. This may occur via one or multiple methods for redundancy, including but not limited to: absence of the head directly prevents the laser from firing, for example by removing an electrical signal that enabled the laser; absence of the head may be detected by the computing resources on the device (the firmware) which in turn does not order the laser to fire; or, in the circumstance most likely to occur, the absence of a laser-compatible head causes a signal to be sent to the software generating the machine file, and a different machine file is generated that replaces the laser on/off instructions with knife up/down instructions, modifies the machine plan to take the new cutting tool into account, and makes other allowances for the different head and cutting tool.

In one implementation, there can be an ink, toner, plotter pen, or other printer head attached in place of the head 160. A print pattern can then be printed onto the material 140. The head 160 can then be re-attached and perform a cut that is aligned with the colors printed on the material 140. Such alignment can be achieved in several ways. First, optical alignment using the cameras can detect the features that have been printed by a motion plan. The motion plan can be created by a system with knowledge of the printed image that instructs the laser head to cut in a pattern that corresponds with the image. Second, a combination of an imaging system to align the pattern and then relying on a digitally stored version of the pattern to generate the cut path. In another implementation, the process can be reversed. First, a cut or engraving can be made by the head 160 on the material 140. After replacing the head 160 with a printing head, the cut or engraved material 140 can be printed upon, using the aforementioned alignment techniques. The optical systems described herein can maintain alignment of the ink source with a cut and ensure the proper distance between the cut and the ink source in the head 160. In one example, the head can have equipment enabling it to function as an inkjet printer. Then, for example, when the head is installed, the laser no longer activates. The motion plan can be replaced by software similar to that used for traditional inkjet printers, and the head can be instructed to move back and forth, advancing a small amount with each pass, depositing ink as it moves. The result is that the device can function as an inkjet printer, although a traditional inkjet printer moves the material as the head goes back and forth. However, unlike a traditional inkjet printer, this can accommodate material that is thicker and even of variable thickness, and when the ink is applied, further machining operations can be performed, for example with the laser.

In such an example, the software can confirm the precise location of the material and the head after the head had been switched. This could be accomplished through the mechanisms explained elsewhere in this document, for example by looking for one or more marks made by the print head that are distinctive, or by looking for the corners of the material 140.

The techniques described herein used for automatic head adjustment and depth measurement may be used with alternate heads. For example, the distance to the surface of the material 140 can be incorporated, by the motion plan, to move an inkjet head up and down to maintain optimal distance from the surface being printed. Also, the depth measurement techniques described herein can be used with a 3D printing head to determine if the print is progressing properly.

Fans in the CNC Machine

Figure 6:
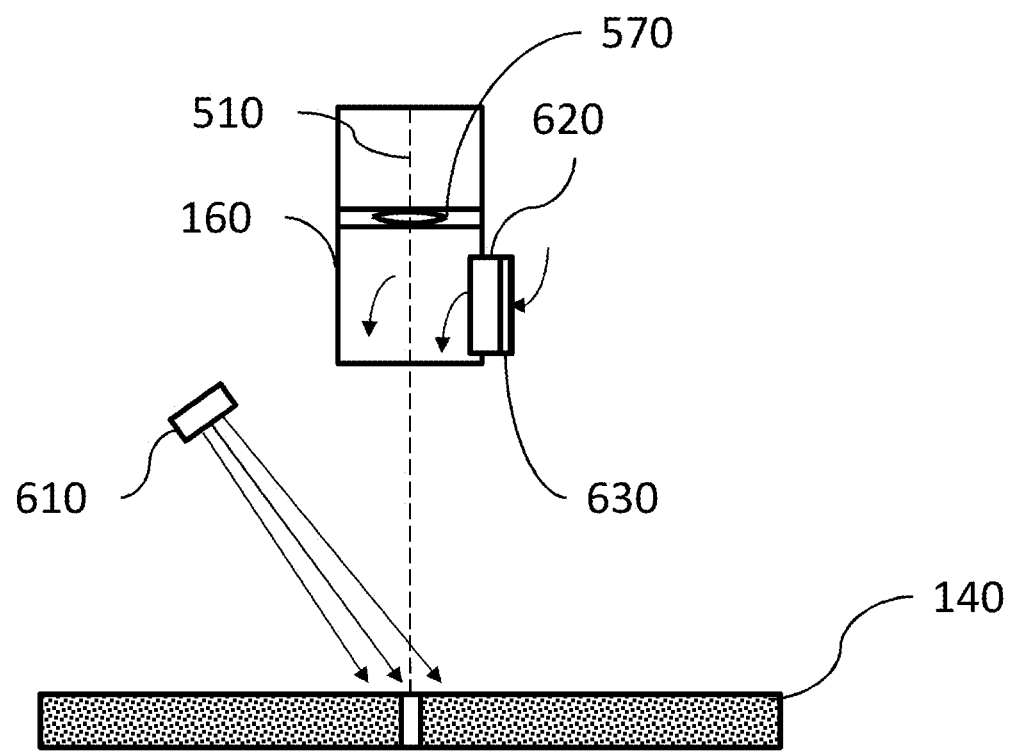
FIG. 6 is a diagram illustrating fans integrated into the head, consistent with some implementations of the current subject matter.

FIG. 6 is a diagram illustrating fans integrated into the head 160, consistent with some implementations of the current subject matter. The head 160 can incorporate any number of fans to assist in removing or preventing undesired particulates from accumulating in the head 160. Fan operation can be coordinated with camera or sensor data, in either an open-loop or closed-loop manner to respond to observed conditions.

In the implementation where the CNC machine 100 is a laser cutter, there can be an air-assist fan 610 that directs a stream of air or other gas to the cut location or a location proximate to the cut. The air-assist fan 610 can direct air to the cut as shown by the vertical arrows. The air-assist fan 610 can be mounted to any component in the CNC machine 100, for example, to the head 160, an arm extending into the interior of the CNC machine, etc. The air-assist fan 610 can also include a filter to remove particulates. The air assist fan can also be located remotely, for example at a fresh air intake on the side of the machine, with the air routed to the head by means of a hose or other routing mechanism.

In another implementation, there can be a purge fan 420 installed in the head 160. Referring back to FIG. 5, the head 160 can house, for example, turning mirrors, lenses, windows, etc. There can also be one or more purge fans that create an area of positive pressure. As shown in FIG. 6, the purge fan 620 takes air from outside the head 160 and injects it into the volume on the side of an optical element, for example the lens, to create the area of positive pressure on the side closest to the material 140. This region of positive pressure reduces contaminated air or debris from entering the head 160 from below, or through other openings in the head 160. The purge fan 620 can also include a filter to remove particulates from the fan intake. The purge fan can also be located remotely, for example at a fresh air intake on the side of the machine, with the air routed to the head by means of a hose or other routing mechanism. Even if fresh air is not routed directly, fresh air can be directed by fans at the intake for the purge or air assist fans. Air routed in this manner can have a higher component of fresh air than from the interior of the unit. Air intended for purge can also be used for air assist, or vice versa.

In some implementations, there can be (though not shown in FIG. 1) exhaust fans, ventilation fans, cooling fans, etc. These fans can be larger and more powerful than the air-assist fan 610 and the purge fan 620. Operation of any of the fans, for example the larger fans described above, can be interfaced with the motion plan to, for example, operate at designated speeds at different parts of the motion plan. Here, data about expected debris and/or smoke can be accessed from a computer memory ahead of time to coordinate fan operation with the motion plan based on the expected amounts of smoke and/or debris. This data can be cross-referenced with, for example, a particular cut, material, CNC machine operating parameters, etc.

These fans can be controlled or coordinated with other sensor data that is received during operation of the CNC machine 100 (for example from smoke detectors or cameras that image smoke or particulates). The real-time sensor data can provide basis for updates to the motion plan based on the fan settings, limits of the fans, or noise/vibration limits set by a user or preset in the system. Thus, in some implementations, the fan speed can be varied continuously based on the observed smoke level, particle counts, chemicals detected, or other parameters observed by sensors in the CNC machine 100. Conversely, the motion plan can remain unchanged and the fan speed adjusted to compensate for changing conditions in the CNC machine 100. There can also be feedback mechanisms where fan operation is tied to a priority of operations. For example, there can be instructions for keeping the fan noise (possibly measured by onboard microphones) or RPMs below a certain value. However, if smoke or debris is detected that exceeds a predefined limit, then the fan speeds can be increased if keeping smoke levels low is higher priority than reducing noise.

In another implementation, the user can be instructed not to open the lid of the CNC machine 100 until internal smoke levels have reached acceptably low levels. The instruction can be, for example, an audio or visual alarm, a status indicator on the CNC machine 100. The CNC machine 100 can also incorporate automatic locking of the lid until the conditions for allowing opening are satisfied.

Again, any of the fan operations described herein apply equally to implementations where the CNC machine 100 is a 3-D printer, inkjet printer, lathe, etc.

Gantry-Mounted Laser

Figure 7:
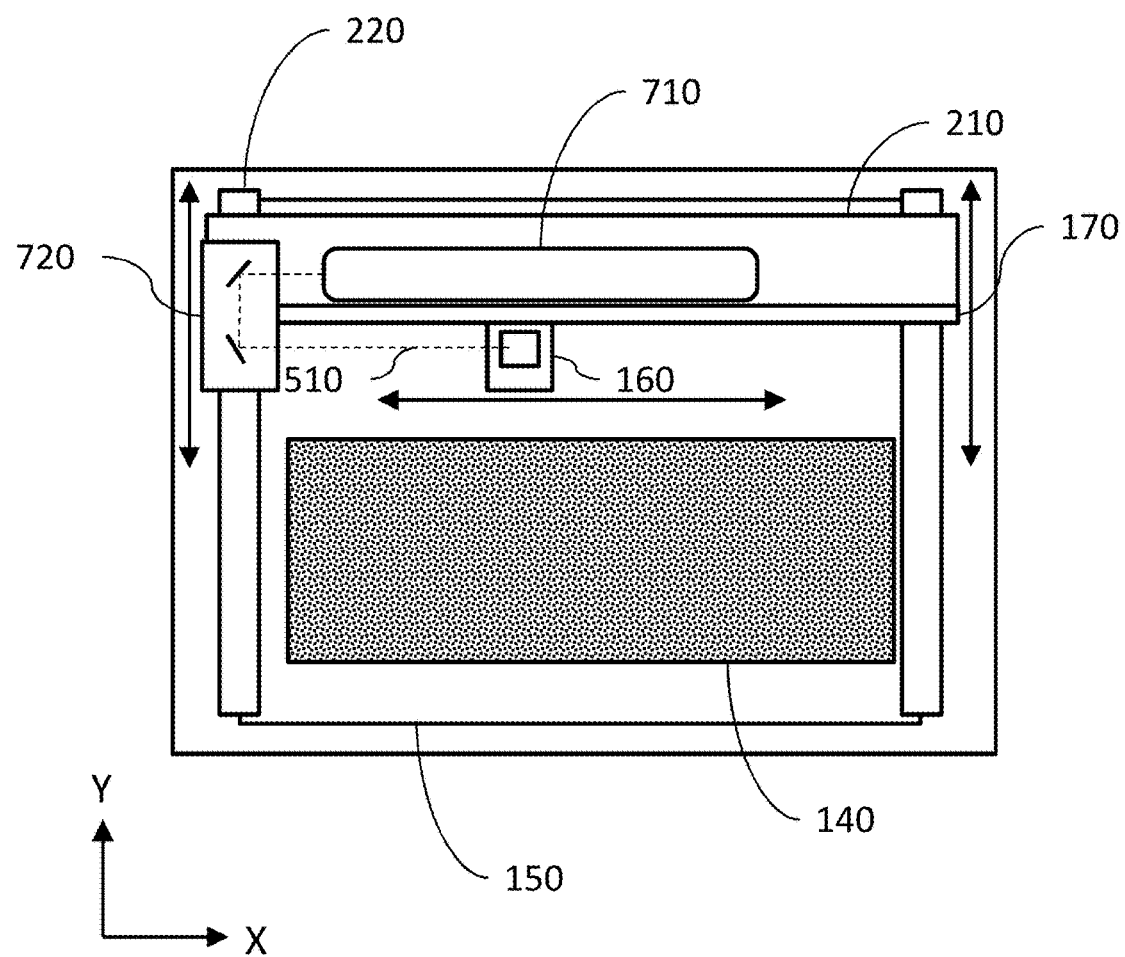
FIG. 7 is a diagram illustrating a top view of the CNC machine having a laser and the head both mounted on a gantry, consistent with some implementations of the current subject matter.

FIG. 7 is a diagram illustrating a top view of the CNC machine 100 having a laser and the head 160 both mounted on a gantry 210, consistent with some implementations of the current subject matter. The gantry 210 can be, for example, positioned over the material bed 150. The laser 710 can translate, for example, only in the Y direction on a track 220 connected to the gantry 210. The gantry 210 can also hold the head 160, which translates only in the X direction on the track 220. The head 160 and the laser 710, both mounted on the same gantry 210, can maintain a fixed Y separation.

This configuration has several advantages. First, the overall beam path can be shorter than it would be if, for example, the laser 710 was outside the CNC machine 100 or even at a fixed location within the CNC machine 100. Furthermore, alignment of the laser 710 with the head 160 is simplified by having them both referenced to the gantry 210.

The gantry 210 can interface with independent gantry actuators (one or more on each track 220) that are responsible for moving each end of the gantry 210 in order to maintain or restore alignment of the gantry 210. The motion plan can control the gantry 210 actuators to operate independently, together, or in any manner consistent with the execution of the motion plan. Alternate implementations can have one actuator or any number of additional actuators. In the case of two or more actuators, they can be driven separately to adjust the angle of the gantry 210, for example making it parallel to the material bed 150.

In one implementation, the laser 710 can be oriented in the X direction, and a turning system 720 can be mounted on the gantry 210 to direct the beam 510 from the laser 710 to the head 160, for example with a pair of mirrors. The laser beam from the laser 710 can be turned by a known amount, for example 180°, to enter the head 160 parallel to beam direction from the laser 710. Since the head 160, the turning system 720, and the laser 710 are all mounted on the gantry 210, their alignment relative to each other can be guaranteed if the gantry 210 is kept from disturbance, even if the remainder of the CNC machine 100 is disturbed.

Sealed Optical System

Figure 8:
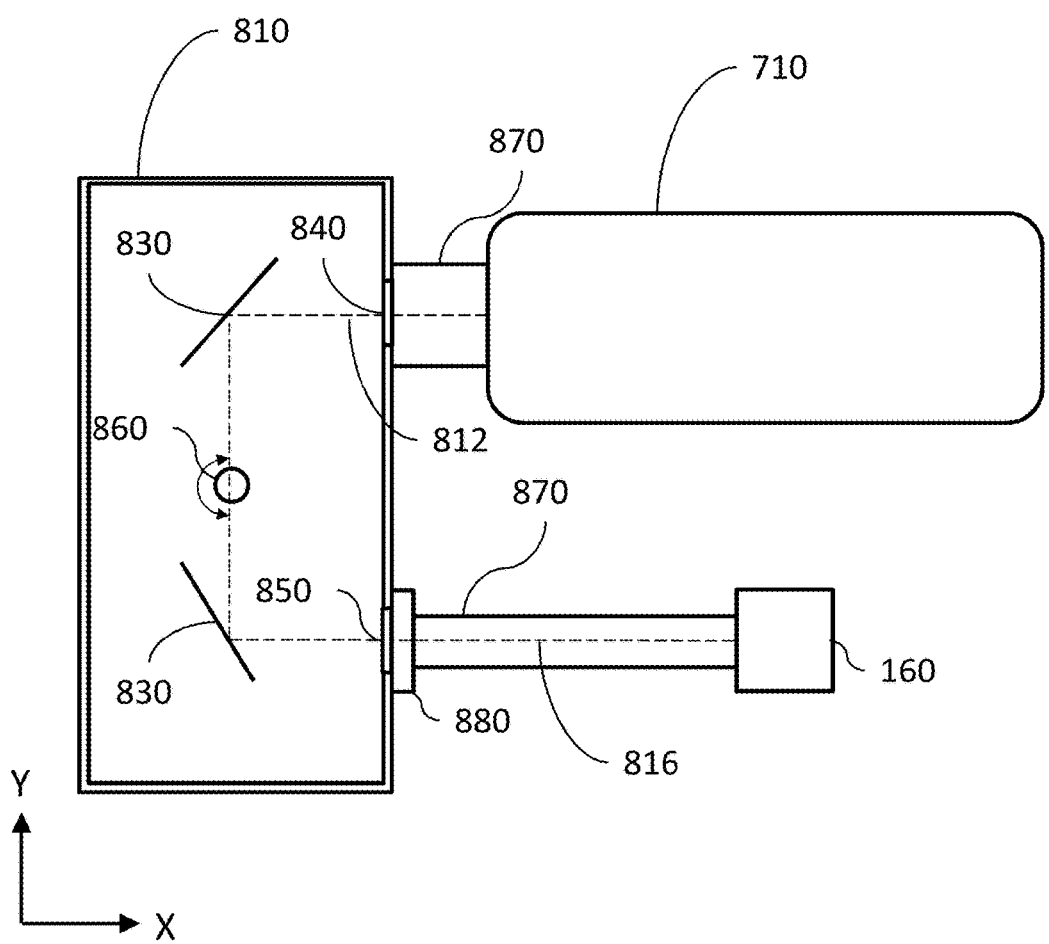
FIG. 8 is a diagram illustrating a sealed optical system, consistent with some implementations of the current subject matter.

FIG. 8 is a diagram illustrating a sealed optical system 810, consistent with some implementations of the current subject matter. In one implementation, for example where the CNC machine 100 acts as a laser cutter, there can be a sealed optical system 810, similar to the turning system 520, to guide the laser beam 310 from the laser 310 to the head 160. As described below, the sealed optical system 810 can be combined with the laser 310 to result in a closed system where none of the turning mirrors or laser optics are exposed to outside (or otherwise contaminated) air, with the possible exception of an aperture with a window that can be easily accessed and cleaned.

In one implementation, the sealed optical system 810 can include an entry aperture 840, a housing, two turning mirrors 830 oriented at a fixed angle to each other which in one implementation is 90°, and a window attached to an exit aperture 680. The sealed optical system 810 can also include one or more pivots, possibly on different axes, to allow the sealed optical system 810 to rotate, thus changing the angle of the turning mirrors 830 relative to the incoming laser beam 812. The mirrors can also be mounted so that they are independently adjustable within the system 810. In the example shown where the axis of the pivot is perpendicular to the diagram and the angle of the mirrors is 90°, by adjusting the angle of the sealed optical system 810, the separation of the incoming laser beam 812 and the outgoing laser beam 816 can be adjusted without affecting the angle of the final beam 816, as would occur if a single mirror 830 was adjusted independently. Because in this example the turning mirrors 830 are oriented to always result in a 180 degree turn regardless of the angle of the sealed optical system 810, rotating the sealed optical system 810 only translates the outgoing laser beam 816 while retaining parallelism between the incoming laser beam 812 and the outgoing laser beam 816. Such a translation can be adjusted to align the laser beam 350 to optical elements in the head 160.

The windows can be any sort of removable optical window suitable for the transmission of laser light from the sealed optical system 810 to the head 160. In one example, the laser light wavelength can be 10.6 microns emitted from a carbon dioxide laser, and the window can be Zinc Selenide (ZnSe). The windows can act to substantially seal the sealed optical system 810 against air which can contain dust, smoke, or other contaminants that can coat any of the other optical elements in the sealed optical system 810 or in the laser 710. In place of a window, in the laser 710 or head 160, pressurized air can be introduced by means of a fan or a compressed air line, preventing contaminants from entering by maintaining positive pressure in the enclosure. Alternatively, the exit aperture 850 can simply be extended, optionally with baffles, to prevent contaminants from migrating into the sealed optical system 810. Other techniques can be used to reduce or eliminate contamination of the output window including, the direction of clean air at the window, the design of airflow in the system so that dirty air is not directly routed at the window, and other measures.

In addition, there can be a sleeve 870 that can be used to couple the laser 710 and/or the head 160 to the sealed optical system 810 in such a way to prevent contaminated air from affecting the laser 310 or a window on the head 160 that is inside the sleeve 870. The sleeve 870 can be rigid, or flexible to allow for pivoting motion of the sealed optical system 810. The sleeve 870 can be, for example, a flexible or collapsible sleeve, a rigid telescoping tube with grease or other lubricant acting as a sealing fluid, etc. A combination of these techniques, such as an extended exit aperture with pressurized air, can also be used.

Laser Alignment System

Figure 9:
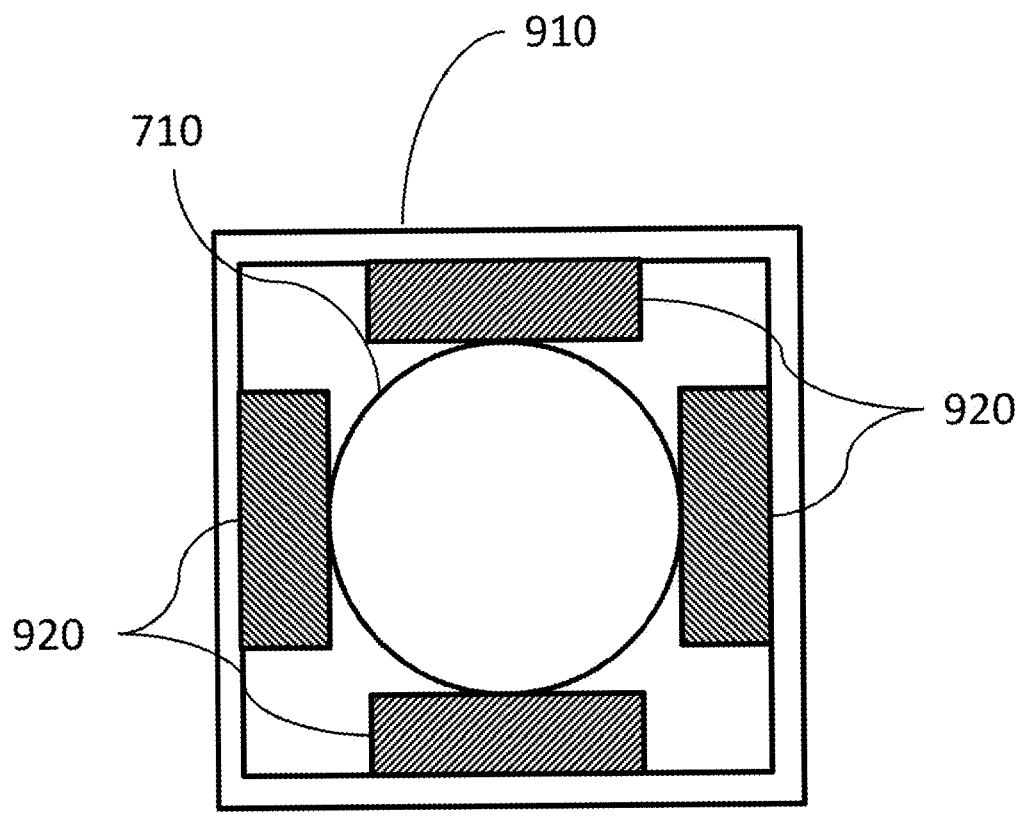
FIG. 9 is an end sectional view illustrating bumpers aligning the laser with a housing, consistent with some implementations of the current subject matter.

FIG. 9 is an end sectional view 500 illustrating bumpers 920 aligning the laser 710 with a housing 910, consistent with some implementations of the current subject matter. In one implementation, the laser 710 can be secured inside the housing 910 with the laser beam exiting through an exit aperture (not shown) on the housing 910. When either the laser 710 changes, for example, when being installed, replaced with a new model or otherwise having a different physical size, or when the housing 910 changes, the laser 710 may no longer be centered with the exit aperture. To have the laser 710 aligned with the laser aperture; there can be a number of bumpers that abut the laser 710 to position the laser 710 in the proper location. In one implementation, there can be two pairs of bumpers 920, one pair that run vertically on either side of the laser, and another pair that run horizontally on the top and bottom of the laser 710. With a known laser size, and known dimensions of the laser housing, the thicknesses of the bumpers 920 can be selected to align the laser 710 with the exit aperture.

The beam path can be determined, for example, before or after the laser is installed. Bumpers 920 can then be selected based on the determine angle and offset of the beam relative to the housing or the exit aperture. The bumpers 920 can be manufactured beforehand to be a known size and then the bumpers 920 that are best able to correct for the angle and offset can be selected. Alternatively, the bumpers 920 can be custom-made to provide the required correction, or bumpers can be stacked, or bumpers can be fabricated via a method such as machining or 3D printing. Information about any expected or measured misalignments can be provided to a user and appropriate bumpers 920 can be pre-selected to correct for the misalignment upon installation.

Figure 10:
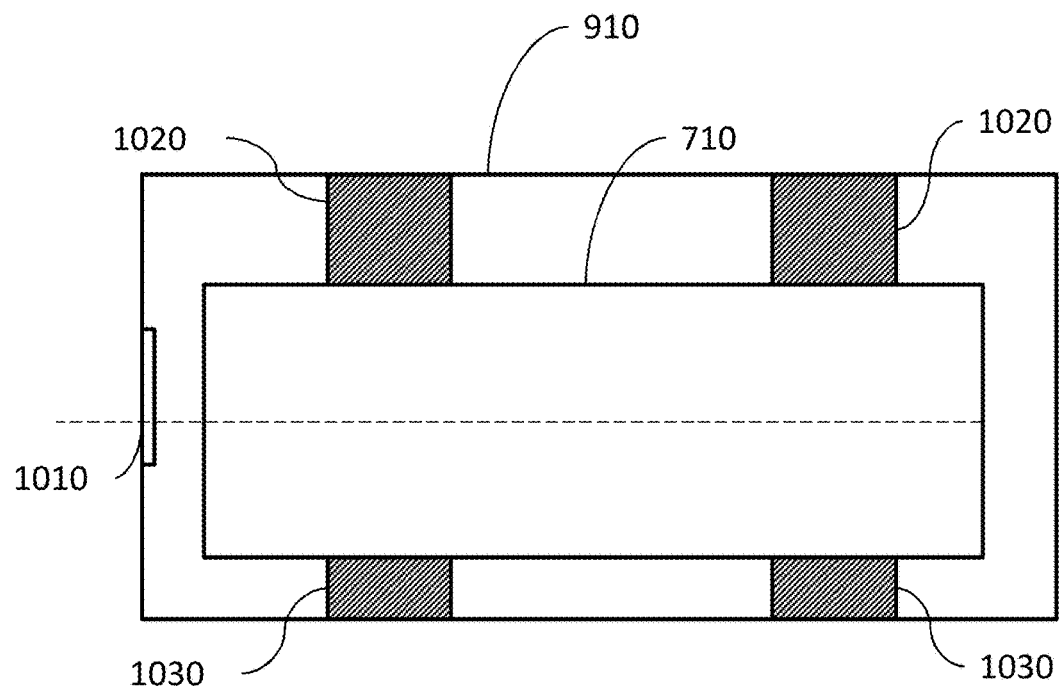
FIG. 10 is a top sectional view of the laser offset by the bumpers from the center of the housing, consistent with some implementations of the current subject matter.
Figure 11:
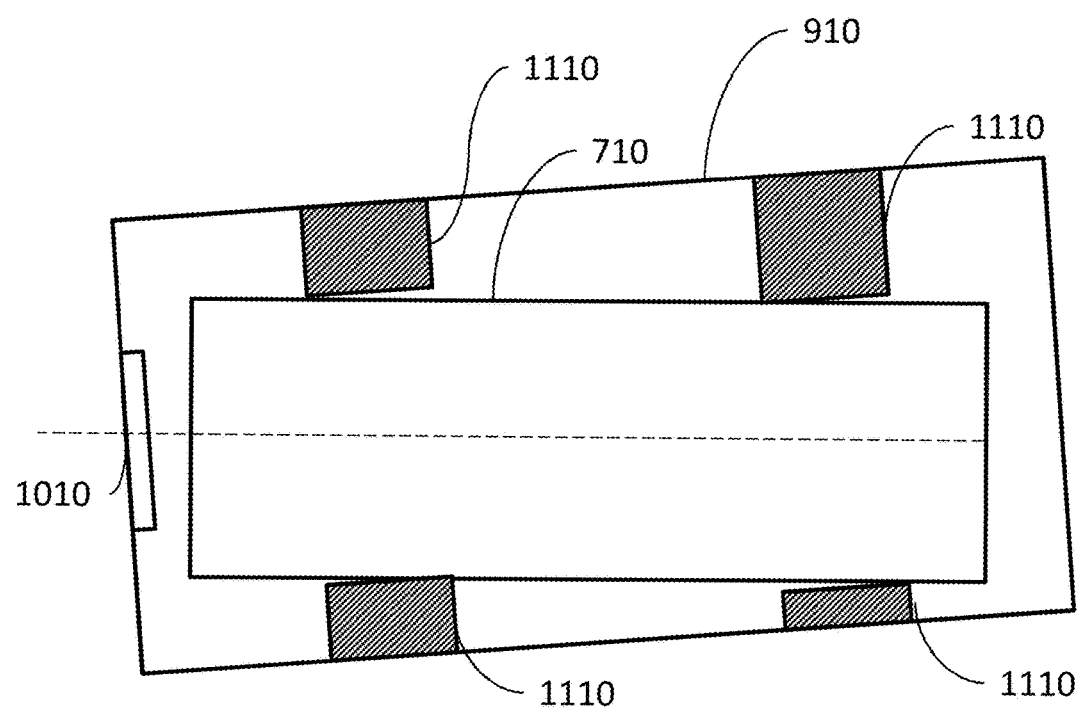
FIG. 11 is a top sectional view of the bumpers aligning the laser with an aperture in a misaligned housing, consistent with some implementations of the current subject matter.
Figure 12:
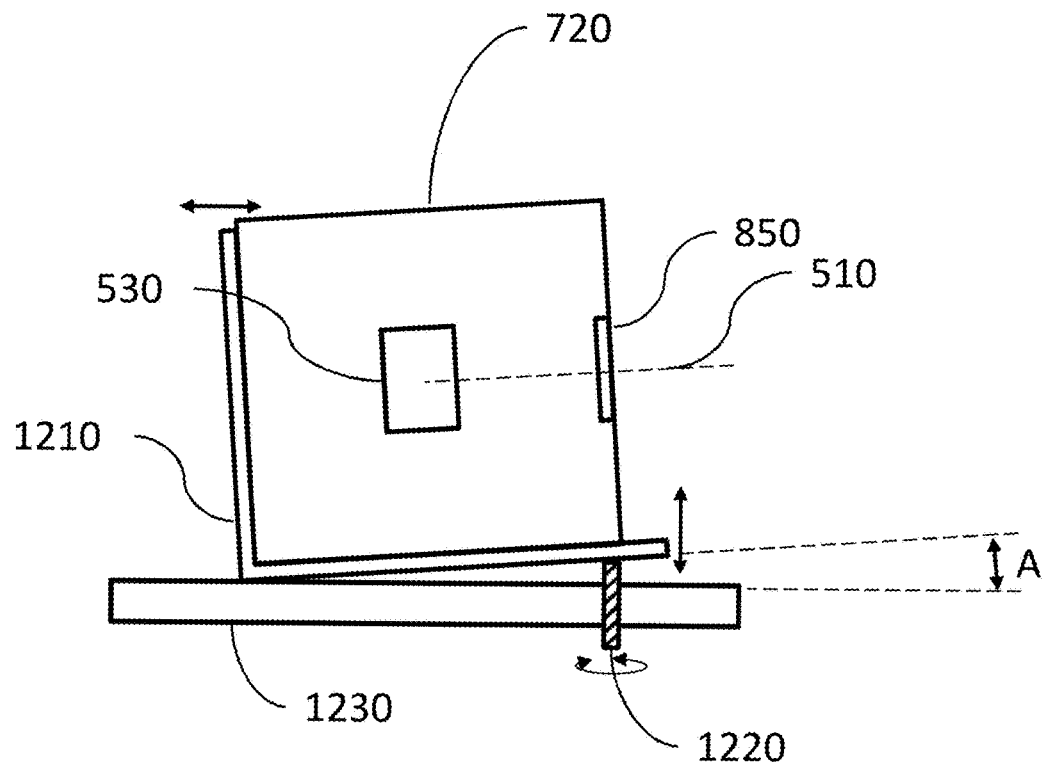
FIG. 12 is a front sectional view of an angularly adjustable turning system, consistent with some implementations of the current subject matter.

FIG. 10 is a top sectional view of the laser 710 offset by the bumpers 1020, 1030 from the center of the housing 910, consistent with some implementations of the current subject matter. FIG. 11 is a top sectional view of the bumpers 1120, 1130 aligning the laser with an aperture 1010 in a misaligned housing, consistent with some implementations of the current subject matter. There can be multiple sets of bumpers, each set providing a center location for the laser 710 inside the housing. As described above, the laser 710 can be centered on the exit aperture 1010, however the laser 710 can also be offset, or angled, by using bumpers of predetermined thickness. For example, as shown in FIG. 10, the right vertical bumpers 820 are thicker than the left vertical bumpers 830, resulting in a translation of the laser from the center of the housing. Similarly, as shown in FIG. 11, two differently sized sets of bumpers 1120, 1130 are used to have different center points relative to the housing 910. When the laser is positioned with the bumpers 910, the laser 710 is angled relative to the housing 910.

Laser Vertical Alignment System

FIG. 10 is a front sectional view of an angularly adjustable turning system, consistent with some implementations of the current subject matter. While the features described above relate to alignment in the X and Y directions, the features described below address methods of aligning the vertical angle of the laser beam (or in the Z direction). A further method of aligning the output of the laser with the laser head 160 is to adjust the vertical angle A of the turning system 720. In one implementation, the turning system 720 can be mounted to, or rest upon, a rotatable mount 1210. The rotatable mount 1210 can, in some implementations be connected to the CNC machine 100 with a pivot or hinge. In other implementations, there can be a stationary point of connection, for example with a weld, fastener, or with a contiguous part. There can also be an actuator 1220 which can act to move one part of the turning system 720 in such a manner as to effect a rotation of the turning optics 530 in the turning system 720. In the example of FIG. 10, this is shown by the actuator 1220 being a screw which, when turned, causes the angle of the rotatable mount to change. In another example, the actuator can be powered or computer controlled. As shown, this is a rigid rotation of the rotatable mount 1210. However, for a rotatable mount 1210 fixed at one location, the actuator 1220 can result in a mechanical deformation of part of the rotatable mount 1210, resulting in substantially the same rotation effect. In some implementations, the neutral, or rest angle, can be an angle such that the emerging laser beam is not parallel to the entering laser beam. In this implementation, the actuator 1220 can be adjusted until the desired alignment is achieved. Initially, the angle A can be, for example, approximately 5, 4, 3, 2, 1, 0, −1, −2, −3, −4, or −5 degrees. In some cases, an angle of 0 may not be optimal. For example, if an entrance window to the laser head 160 is higher than the laser output from the beam, then the angle A can be adjusted to a value greater than 0 to allow the laser beam to go through the center of the entrance window.

FIG. 13 is a front sectional view of a cantilevered angularly adjustable turning system, consistent with some implementations of the current subject matter. Similar to the implementation of FIG. 11, above, the cantilever can include an angle bracket 1310 upon which the turning system 720 rests or is mounted to. The screw 1320, shown extending between the horizontal arm and the vertical arm of the cantilever, can be turned to cause a deflection of the horizontal arm. The deflection causes the angle of the beam 710 to move in the vertical direction, allowing vertical alignment of the laser beam with the head 160. Also similar to the above, the interior angle of the angle bracket 1310 can be 90 degrees, or can have an offset that is correctable with the screw 1320. In some implementations, the offset can be approximately, 5, 4, 3, 2, 1, 0, −1, −2, −3, −4, or −5 degrees. In other implementations, other the interior angle can be 60 degrees, 45 degrees, 30 degrees, etc. In any implementation, the screw can act to correct the initial small adjustment required by the angle of the bracket 1310.

Figure 14:
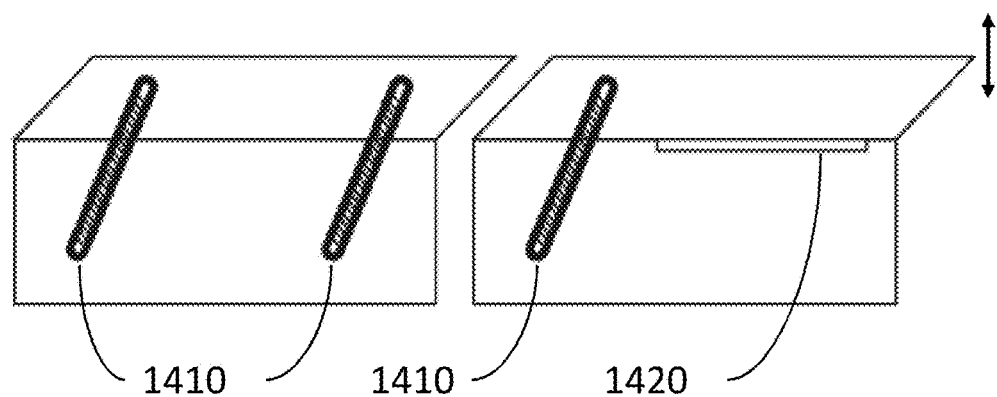
FIG. 14 is a perspective view of a second cantilevered angularly adjustable turning system, consistent with some implementations of the current subject matter.

FIG. 14 is a perspective view of a second cantilevered angularly adjustable turning system, consistent with some implementations of the current subject matter. Multiple screws 1420 can be used so that the bracket is deflected equally at all points along the Y axis. Alternately, the corner of the bracket can be selectively weakened or strengthened along the Y axis (shown by the corner area 1410) so that force applied at a single point by the screw 1420 can result in equal vertical deflection across the bracket.

Head Location Detection

Traditionally, a variety of systems are used to detect machine position. There can be encoders on the motor, on the shaft, and/or mechanical switches that detect when the machine is in extreme positions or to "reset" the software's internal estimation of the head's position to a correct, known state.

These approaches can be replaced by camera systems in some implementations of the current subject matter. An overhead camera, for example the lid camera 110, can visually locate the head 160 or other parts of the system. A camera 120 mounted on the head 160 can detect when the head 160 has been moved to a specific location, for example over a target printed on a home location, with extreme accuracy.

Head Motion Detection

Cameras with a wide angle view can determine position, velocity, acceleration, and other motion parameters for the head 160. A camera 120 mounted on the head 160 can do this by observing the apparent motion of the material 140 in the images it acquires. Special purpose cameras can be optimized for this, for example the image sensor on an optical mouse may be repurposed for the head 160 providing dedicated hardware that is optimized to calculate displacements. A camera 110 mounted on the lid 130 or elsewhere, with a view of the head 160, can monitor the head 160 directly.

Calibration Cuts to Characterize Material

When a material 140 is introduced into a CNC machine, it may have unknown physical properties. As a result, it may not be known what settings are optimal for machining. These settings can include, for example, rotary speed for a CNC mill or lathe, water power for a waterjet, or laser power and speed for a laser cutter.

With a camera, calibration passes can be made over the material 140 to determine appropriate settings for the desired task. In one implementation, to determine a minimum power to make a cut with a laser cutter, cuts of increasing power can be made until the material 140 is penetrated. Cuts of lower power can be measured for cases in which the user wishes to mark but not penetrate the surface. The camera can also capture how cuts at different power levels, speeds, and so on, will look like. For example, light-color plywood may get slightly darker when the laser is activated at 20% power at maximum speed. Increasing to 30% power may darken it slightly more. But at 40% power, the top veneer layer of the plywood may be pierced, revealing the layer below, which may be a completely different color—lighter or darker. With a camera, the resulting visual appearance of the material 140 can be determined. The determined response of the material 140 from a given processing step can be incorporated, either automatically or by a user, into the motion plan.

Material Thickness Determination—General

A variety of methods can be used to determine the thickness of the material 140 to be cut or engraved. One method can be to determine the height of a top surface of the material 140 and compare this height to a known position of a bottom surface of the material 140. Typically, though not necessarily, the bottom surface of the material 140 coincides with the top surface of the material bed 150, which can be of a known height. The difference between the height of the top surface of the material 140 and the height of the bottom surface of the material 140 can then be determined to be the thickness of the material 140. In another implementation, the process used to determine the thickness of the material 140 can be calibrated by measuring a material 140 with a known thickness. For example, an object with a 1 cm thickness can be placed on the material bed 150. Data can be acquired by the cameras and the data can be associated with the known thickness of the object. In another implementation, the cameras can determine the height of the surface the material 140 is resting on. For example, if there are other pieces of material 140 between the topmost material 140 and the material bed 150, the cameras can measure the height of the topmost surface before material 140 is inserted or measure the height of the topmost surface in a location not obscured by the material 140.

In one implementation, the height at different points can be measured, for example in a grid pattern, on the surface of the material 140 in order to characterize the curvature of the material 140. Once the height at many points on the material 140 is known (and consequently the surface curvature), instructions can be generated so that one or more actuators can follow the curve of the material 140. For example, a cutting laser can be kept in focus, a camera can be kept in focus, a 3D printer head can maintain a constant separation from the material base, or a CNC milling bit can be kept a constant distance from the material 140.

Once the distance between the surface and a lens (or any other reference point in the CNC machine 100) is known, this can be incorporated to precisely control the height of the head 160 (and optics internal to the head 160) when machining.

Contrast detection, phase detection, or any other distance finding techniques described herein can also be implemented on other machines, for example, a CNC mill where the distance determines where the head 160 is to position a bit. In this way, the motion plan can incorporate, for example, contrast detection, autofocus, etc. to perform real-time analysis of the position of the material 140 and/or the position of the head 160 relative to the material 140.

Material Holding

While knowing the position of surface of the material 140 is important, and the surface position (or height) can be easiest to measure, the thickness of the material 140 is also important. If the material 140 can be pressed flat, for example against the material bed 150, then the height of the top of the material 140 minus the height of the material bed 150 equals the thickness. For that reason, methods for holding the material 140 firmly to the support can be combined with any method for measuring the thickness of the material 140. This can be helpful in situations where the material 140 may have a natural tendency to flex or bow, or where the material 140 may be lightweight and have air pockets underneath.

In one implementation, there can be at least one plunger that can hold the material 140 firmly against the support. The plunger can be proximate to the point of cutting, or can be at another location or locations on the material 140. Also, the position of the plunger itself can provide a cross check to any optical determination of material 140 thickness, if for example, the height of the surface of the plunger is known relative to the surface of the material bed 150.

In another implementation, the material bed 150 can be a vacuum table with a number of apertures extending through the surface to a vacuum system. The vacuum system can create a negative pressure through the apertures and underneath the material 140, which is then held down against the vacuum table by the pressure difference on either side of the material 140.

There can be situations where the material 140 is unable to be pressed against the material bed 150, for example, curved metal pieces, stone, etc. If the material 140 is known to be of a constant thickness, then the thickness can determined from a measurement at any location on the material 140. If the material 140 contacts the reference surface at or more points, then a determination of the lowest point on the surface of the material 140 can be interpreted by the CNC machine 100 and compared to the height of the material bed 150 in order to determine the thickness of the material 140. In the case where the material 140 thickness is measured in multiple locations, but not at the location where the surface is lowest, a map can be created from the points measured. The slope calculated from existing points may be used to identify a likely area for a local minimum, which can in turn be sampled for more accurate measurements.

Material Thickness Determination by Stereoscopy

One method for determining the height or position of surface features of the material 140 can be to perform stereoscopic observations of the material 140 in order to determine a depth profile of the material 140, using either multiple cameras or multiple images from the same camera (moving between each exposure) to determine distance. In one implementation, the stereoscopic measurements can be performed by one or more lid cameras and/or head cameras. There can also be additional cameras dedicated for this purpose positioned within the CNC machine 100. Here, the multiple images required for producing a stereoscopic image can be interpreted by an image analysis program in order to determine, based on the differences between the images taken at different angles, the depth of the features imaged on the material 140. To determine the height of the surface of the material, images are captured from two separate cameras, and one or more features on the surface of the material are isolated and considered. The amount by which the observed feature moves between the two camera images indicates its distance and thus the height of the material, in the same manner that human binocular vision uses to determine distance.

In some implementations, a motion plan can be created that includes positioning the head 160 such that a distinctive feature to be measured is within the view of a camera located on the head 160. Then, the camera can acquire an image of the feature. A second motion plan can be created (or a second step in a single motion plan) to move the head 160 by a fixed amount. After the head 160 moves, the feature should be within view of the camera. A second image, containing the feature, can then be captured by the camera. In each of the images, the feature is identified. An image analysis program can then measure how much the feature has moved in each image, relative to the amount of camera movement. Based on the relative apparent movement, the height of the feature can be determined. In general, the closer the feature is to the camera (i.e. height of the feature) the more it will appear to have moved.

Material Thickness Determination by Interferometry

Another method of acquiring the distance to the surface of the material 140 can be to include an imaging laser and an imaging detector to perform interferometry on the surface of the material 140. Here, light from the imaging laser can be used to reflect off the surface of the material 140 and then be directed to a detector. Light from the imaging laser can also be directed to a reference mirror and then also to the detector. The changing number of interference fringes at the detector can be detected and counted in order to determine the distance to the surface of the material 140. In one implementation, a laser output from the head 160, for example that used for cutting, can also be used as the imaging laser. Alternatively, the imaging laser does not have to be a laser, it can be any light source of known wavelength, for example, an atomic lamp, a band-pass filtered light source, etc.

Material Thickness Determination by Contrast Detection

In another implementation, an algorithm that takes multiple images with a camera having a known focal plane when each image is taken can use a variation in focal plane to determine the distance to the surface of the material 140 by determining the image with the maximum contrast. In this implementation, images of the material 140 can be taken by the head camera 120, the lid camera 110, or any other camera in the system that has the ability to adjust its focus, either by changing its position or the position of a lens. The analysis can involve varying the position of the one or more lenses until the image of the material 140 taken by the head camera 120 has a maximum contrast. When this condition is detected, the focal plane of the camera is the same as the distance from the lens to the surface of the material 140, so the height of the surface of the material 140 is known.

In some implementations, the lens can be moved to a first location, for example the top of its range in the camera or in the head 160. An image can then be acquired at that first location. The contrast can be quantified, for example, by taking a Fourier transform of the image and measuring the amplitude of the high-frequency components characteristic of a rapid change in the image. Then, the lens can be moved to a second location, for example lower in the cameras range. The contrast can be quantified after each movement, while moving the lens in the direction that results in an increase in the determined contrast. The lens is in focus when at a location where the contrast is a maximum.

Material Thickness Determination by Phase Detection

In one implementation, phase detection can be used in order to determine distance from a lens to the material 140. In this implementation, images taken of a material 140 are divided into at least two portions corresponding to light passing through at least two different parts of the lens symmetrically arranged to be imaging the same location when the lens is at its focal length from the material 140. The intensity or other image features of each portion can then be compared. The position of the lens can be adjusted until the portions imaged through each of the parts of the lens are substantially identical. When that is complete, the focal length of the lens is the distance of the material from the lens.

Material Thickness Determination by Time of Flight

In one implementation, time-of-flight techniques can be used to determine distance from a source to an object in the CNC machine 100. For example, there can be a light source that emits pulses or other known waveforms of light. A detector can detect the light reflected off a surface. By measuring the time between emission and detection and knowing the path between the source and the detector, the distance between the source (or detector) and the object can be determined. A similar procedure can be performed with a sound source. The time-of-flight can be measured by the detector based on rising or falling edges of a signal, interference patterns, signal ring-down, etc.

Material Thickness Determination by Imaging a Spot Location/Shape

Figure 15:
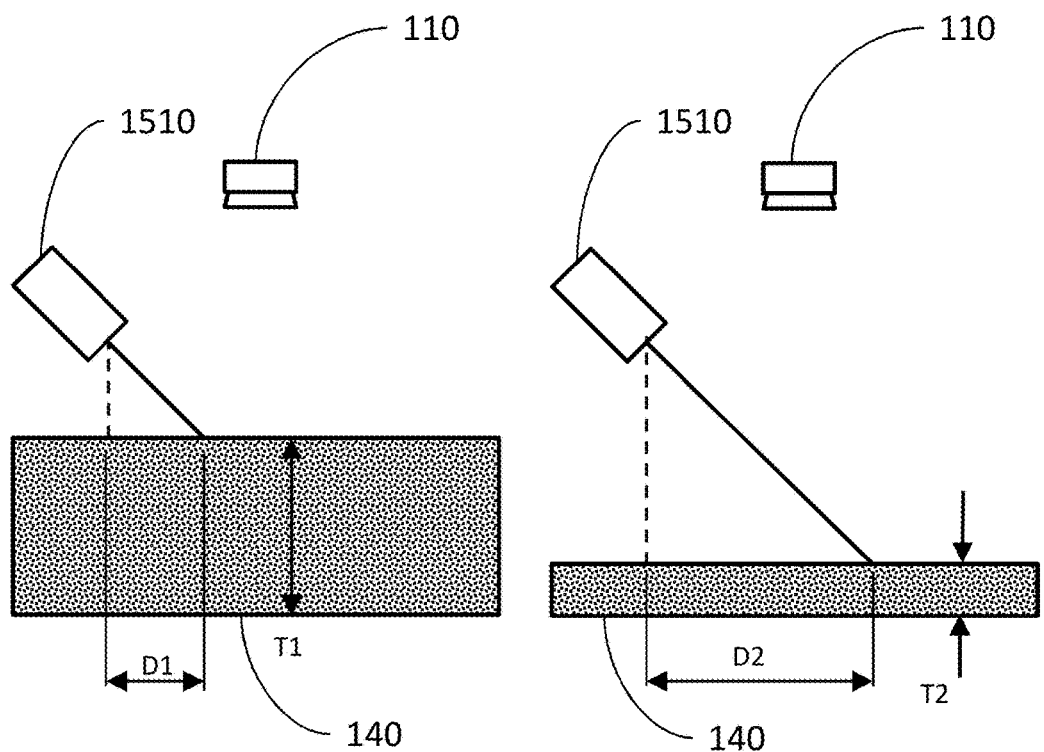
FIG. 15 is a diagram illustrating the determination of material thickness by the lid camera imaging a spot on the material produced by a distance-finding light source, consistent with some implementations of the current subject matter.

FIG. 15 is a diagram illustrating the determination of material 140 thickness by the lid camera 110 imaging a spot on the material 140 produced by a distance-finding light source 1510, consistent with some implementations of the current subject matter. In one implementation, a well-collimated light beam from the distance-finding light source 910, for example from a laser diode or LED with a tight beam, can be pointed at the material 140 at an angle. As shown in the left pane of FIG. 15, a thicker material 140 (of thickness T1) will intercept the beam sooner, at a distance D1 from the distance-finding light source 1510, causing the intersection spot to be visible to the lid camera 110 closer to the distance-finding light source 610. As shown in the right pane of FIG. 15, thinner material 140 (of thickness T2) will allow the beam to travel farther, so the beam will appear to intersect the material 140 farther (at distance D2) from the distance-finding light source 1510. The location of the bright spot on the material 140 can thus be directly proportional to the thickness of the material 140. In other implementations, the distance-finding light source 1510 can be cameras other than the lid camera 110, or any combination of cameras in the CNC machine 100.

In another implementation, the distance-finding light source 1510 can have a measureable divergence. If the material 140 is thick, then the spot on the surface of the material 140 will appear to be small. If the material 140 is thin, then the spot will be larger, as the light will have diverged more before it intersects the material. The thickness of the material 140 can be determined using a trigonometric calculation based on the known divergence angle and the measured size of the spot on the surface.

In a related implementation, the focal length of the distance-finding camera can be made to be as small as possible. If the beam spot is near to the camera it will be in focus and therefore appear smaller; if it is far away, it will be blurry and thus larger and dimmer. This technique may be combined with the divergence technique to make the increase in spot size even more easily detected.

Material Thickness Determination by Imaging Laser Spot Size

Figure 16:
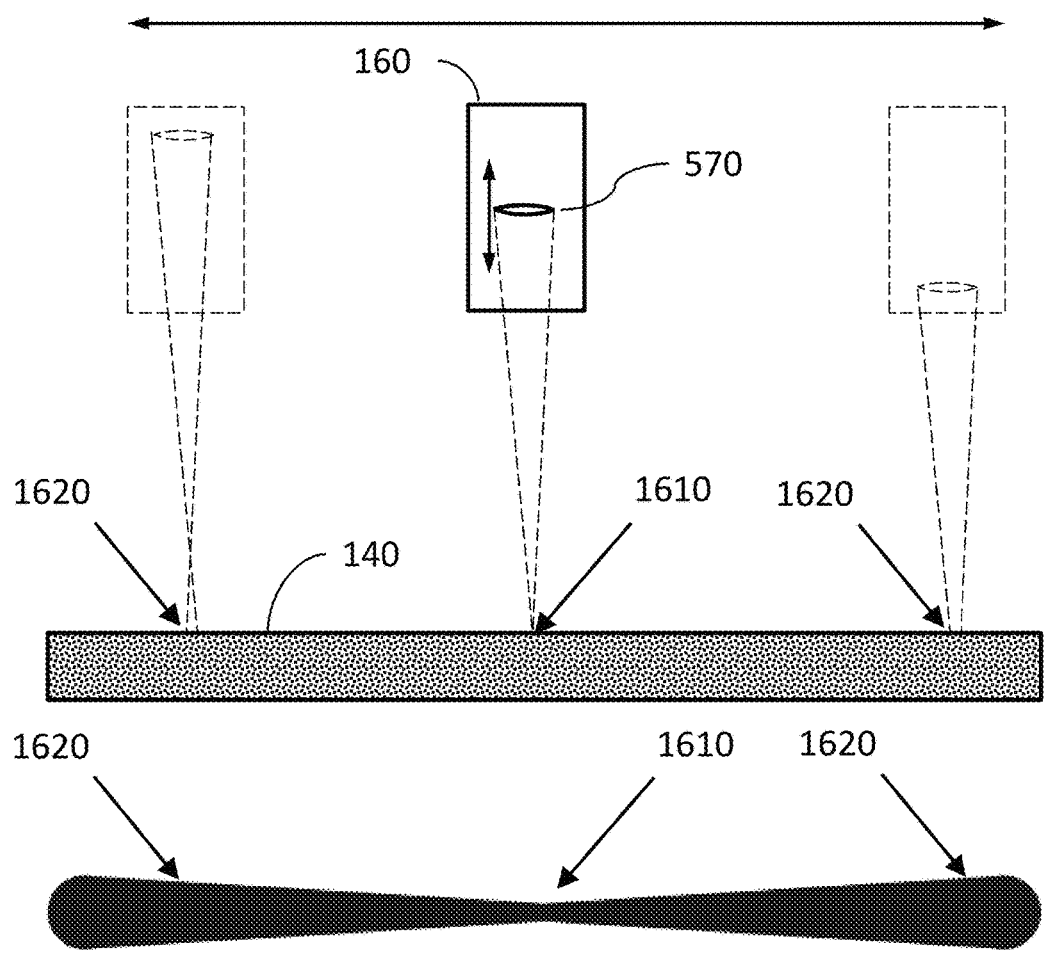
FIG. 16 is a diagram illustrating determination material thickness by imaging a laser spot size, consistent with some implementations of the current subject matter.

FIG. 16 is a diagram illustrating determination material thickness by imaging a laser spot size, consistent with some implementations of the current subject matter. To provide precise cuts, the laser should be focused at the surface of the material 140. If the laser is out of focus, the cut can be larger than expected and the cut may have a different depth than desired. In one implementation, if a lens 570 in the head 160 specifies a particular focal point for the laser, then a minimum spot size 1610 can be measured by a camera viewing the laser spot on the surface. Conversely, if the material 140 is not at a distance equal to the focal length of the lens 570, then the spot size 1620 will be larger. By measuring the spot size, the lens 570 in the head 160 can be adjusted until the laser spot size is either at a minimum, or other known size, which corresponds to the surface of the material 140 being at the focal length of the lens 570. In some implementations this adjustment can be done automatically and/or continuously in order to provide a constant power density at the surface of the material 140. As a result, a consistent cut can be provided even if the thickness of the material 140 changes. Also, if there is a discrepancy between the observed spot size and the expected spot size, then either the "known" focal length of the lens 570 is inaccurate or the determination of the surface height is inaccurate. Indications of these inconsistencies can be provided to the user or otherwise logged by the CNC machine 100. The laser used for this may be the primary cutting laser, or a secondary laser (typically lower-power laser at a frequency that is viewable more readily with a camera, such as a helium-neon laser). The spot size may be observed directly if the secondary laser is at a frequency that the camera can register, or indirectly by looking at the size of the discoloration, engraving, or cut produced by the secondary laser.

In one implementation, the cutting laser can be used to draw a line (shown by the solid horizontal shape in FIG. 16) by moving the head 160 across the material 140 while the laser is operating. While the laser is moving, the focusing lens 570 acquires images as it travels through its full range of motion. When the motion is complete, camera images of the line are analyzed and the narrowest portion is determined. The lens position at the moment the narrowest portion of the line was created corresponds to the point where the beam is in focus, and the moment at which the distance between the lens 570 and the material equals the focal length of the lens, allowing both the laser to be focused and the distance to be determined for other purposes, such as reporting the thickness (measured from the height of the material surface) to the user.

Direct Inspection of Material Thickness

In another implementation, the material 140 can be imaged by a camera at a low angle relative to the surface of the material. The angle can be, for example, 0 degrees (parallel to the surface), less than 5 degrees, less than 10 degrees, etc. This "edge-on" view allows a direct determination of the height of the material. Here, an image of the material can be acquired. The height or thickness of the material 140 is related to the number of pixels of the material in the image. In some implementations, a distance measurement between the camera and the edge of the material can first be performed. Based on the distance from the camera to the edge which is being imaged, a conversion can be performed between the height in pixels and the material height.

Position of the Head Camera

High-resolution cameras, such as the head camera 120, are typically located offset from the path of the beam or other output of the head 160. For example, the head camera 120 can be ahead, to the side, or behind, the path of a cut. Imaging ahead of the cut can allow acquisition of images of the material 140 about to be cut. These images, taken prior to the cut, can provide an updated characterization of debris, smoke, material 140 defects, distance, etc. Similarly, imaging at the point of a cut can allow a real-time feed of image data that can be used to dynamically update the motion plan or provide diagnostic data about the progress of the cut or the operation of the head 160. Finally, imaging a region after a cut is complete can provide image data about the conditions in the output volume immediately after processing. Further imaging after the cut can diagnose conditions after, for example, fans have removed debris or smoke from the cut area. In one implementation, such as for a laser cutter, the head camera 120 can be aligned with the laser output. For example, in FIG. 11 the head camera 120 can be above the mirror 360 (assuming the mirror 360 transmits some light through its surface) and the central imaging line from the head camera 120 can look directly into the cut through the lens 370 and window 380.

More complex motion solutions can also be used. The camera could be mounted on a multi-axis arm, a pan/tilt head 160, an X-Y gantry of its own, or any other motion configuration. Taking the opposite approach, a constellation of preset cameras can be placed around the head 160, with only the cameras closest to the areas of interest activated or utilized.

High-Resolution Cut Images

Figure 17:
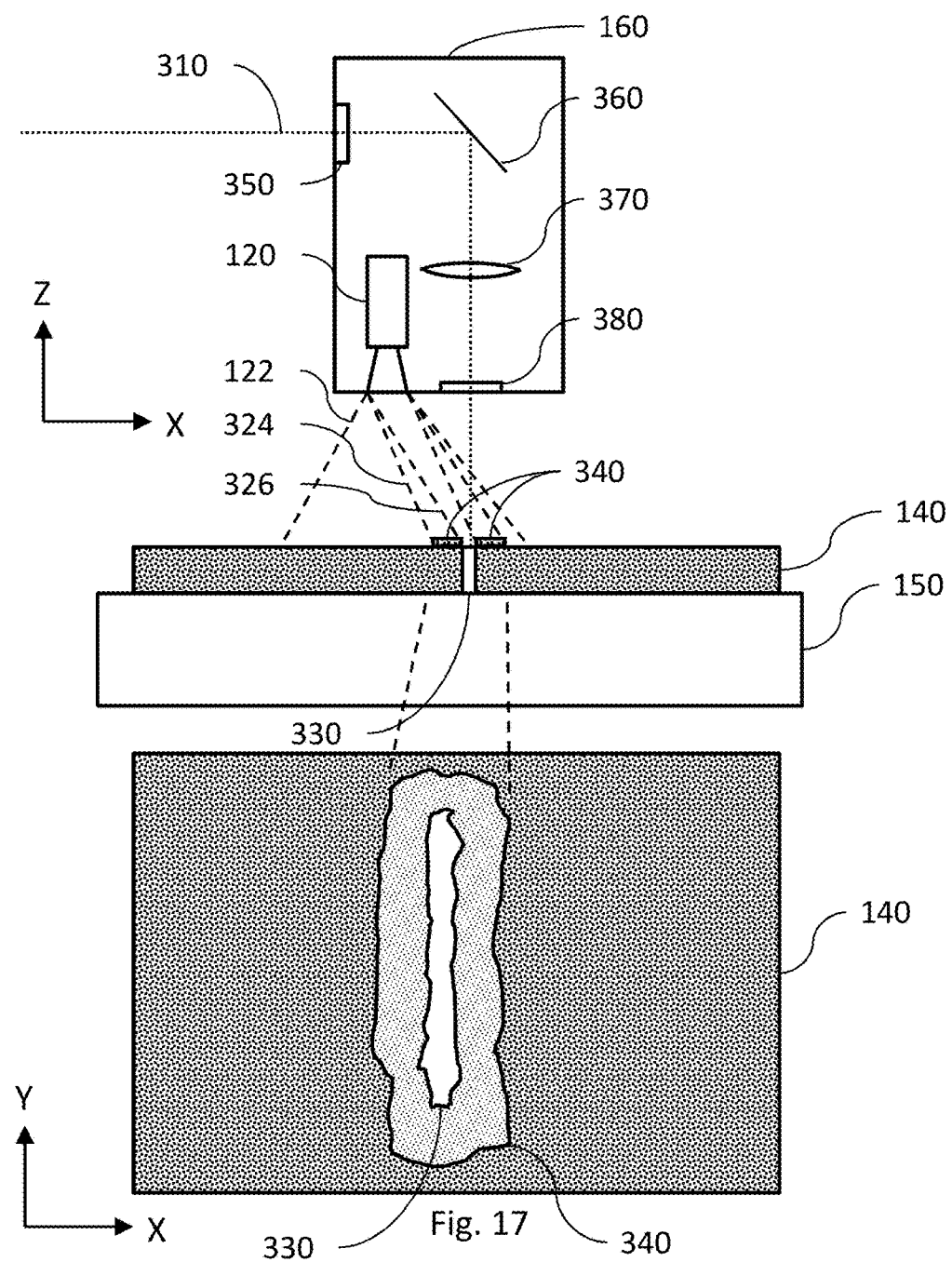
FIG. 17 is a diagram illustrating a camera imaging details of a cut made by the CNC machine, consistent with some implementations of the current subject matter.

FIG. 17 is a diagram illustrating a camera imaging details of a cut made by the CNC machine 100, consistent with some implementations of the current subject matter. As mentioned previously with regard to FIG. 3, there can be cameras that provide high-resolution images of portions of the CNC machine 100, the material 140, etc. One example of such a camera can be the head camera 120, which can be used to provide high-resolution images of a cut and the area proximate to the cut. While the earlier discussion focused on the high-resolution cameras aiding with features that generally impacted the CNC machine 100 operation as a whole, the following discussion generally relates to features enabled by detailed imaging of the cut. Again, while such features are described with regard to a laser cutter, many of the features can be similarly applied to a 3-D printer, inkjet printer, draw knife, etc.

One example of a through-cut is shown in FIG. 17. Here, there is a cut, which extends entirely through the material 140, and also, in this example, there is debris present in the area surrounding the cut. The camera, in this case the head camera 120, can image the output volume 330 (the cut) and the peripheral volume 340 (the debris). Because the head camera 120 is closer to the cut than other cameras, the fine details of the cut and the debris can be used for more precise image recognition techniques.

Implementation of High-Resolution Camera Images

Figure 18:
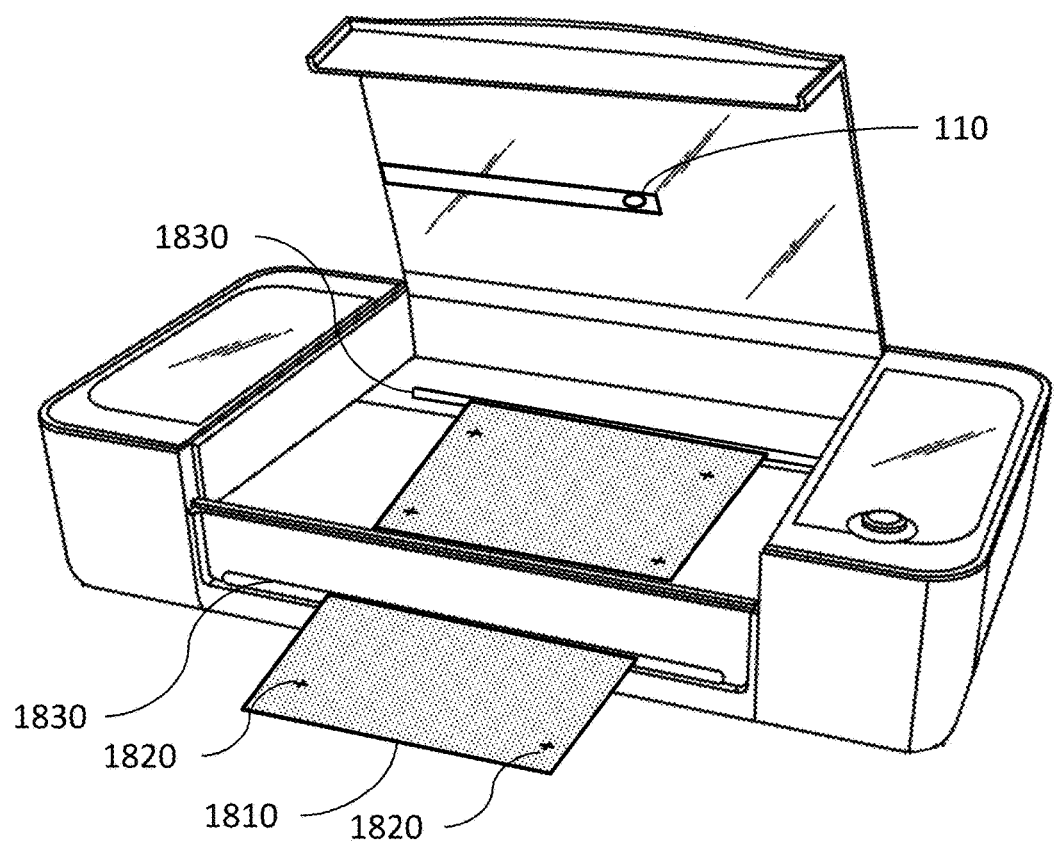
FIG. 18 is a diagram illustrating the lid camera imaging registration marks on an oversized material, consistent with some implementations of the current subject matter.

At any time, and also prior to the cut, high-resolution images can enable, for example, detection of the position and motion of the head 160, calibration of the CNC machine 100, measuring distance to the material 140 surface, tracing of markings imaged by the cameras, kerf measurements, identification of registration marks for double-sided or pass-through cutting, and varying the cut depth. Also at any time, but in particular during the cutting process, cut verification can be performed, errors in output can be detected, inspecting unusual CNC machine 100 behavior, and compensating for hysteresis. These features are discussed in greater detail below.

Pass-Through Cutting FIG. 18 is a diagram illustrating the lid camera 110 imaging registration marks 1820 on an oversized material 1810, consistent with some implementations of the current subject matter. In one implementation, oversized material 710, which can extend beyond the enclosure in one or more directions, can be inserted into the CNC machine 100. This can allow a large pattern to be cut on the oversized material 710, one section at a time. For example, the CNC machine 100 can cut one end, and then instruct the user to move the oversized material 710, and then cut the next section, and so on. The CNC machine 100 can indicate to the user how far to move the oversized material 1810, and/or use indicators to indicate when the oversized material 1810 is too far or at the right location.

The CNC machine 100 can include a pass-through slot 1830 that can allow the oversized material 1810 to be fed through the CNC machine 100 for processing. The pass-through slot 1830 can be substantially aligned with the material bed 150 for holding the oversized material 1810. For example, the bottom of the pass-through slot 1830 can be at the same height as the top of the material bed 150 so that the oversized material 1810 doesn't tilt as it is fed into the CNC machine 100. The pass-through slot 1830 can be integrated with passive or motorized rollers, treads, etc. If motorized, the rollers can be coordinated with the motion plan to advance the oversized material 1810 at specified times and rates. If a motorized feed section is present, then the laser can omit some or all Y axis travel and rely solely on the feed mechanism to move the laser relative to the material in the Y axis. Material feed can also allow motion of the oversized material 1810 in both X and Y, for example to maintain alignment. Optionally, the head 160 can move independently from the oversized material 1810, or the head 160 can be stationary with the oversized material 1810 moving by material feed. The cameras can track 220 the material 140 as it proceeds through the pass-through slot to verify the oversized material 1810 position or otherwise monitor progress during material feed. The cameras, for example the lid camera, can be used to maintain alignment as the oversized material 1810 moves relative to the laser, cutting tool, or other processing head 160.

The positioning of the material, oversized or otherwise, can be specified by a user, or automatically with the cameras and image recognition system. In some implementations, this can be performed by an image of the material 140 being generated on a computer screen. The user can interact with the image by indicating corners, selecting or tracing boundaries, etc. The interaction can be with a touch-screen interface, mouse clicks selecting positions on the screen that map to the material reference points, etc. In another implementation, the software can determine corners by identifying, from image data of the material, corners of arbitrary angle, for example, approximately 90, 75, 60, 45, or 30 degrees. Recognition of standard shapes, such as polygons, circles, ellipses, can also be identified either in association with the pass-through cutting features described herein or during any other processes executed by the CNC machine 100. In any implementation, images from the head camera 120 and the lid camera 110 can be combined to find any of the edges or corners of the material 140. For example, the lid camera 110 can find the locations roughly and the head camera 120 can provide a higher-resolution image for a more precise estimate. Fiducial marks can be cut at any time to provide reference points when acquiring or re-acquiring position of the material 140. For example, fiducial marks can be cut in scrap regions of the material 140. These fiducial marks can be printed out on adhesive paper that can be provided prior to a cut, and then imaged during the cutting process to provide registration. Optionally, the fiducials or other registration patterns can be repeated over a substantial portion of the adhesive paper or surface of the material 140. Markings used for other purposes, for example bar codes for material identification, can also be used as fiducials.

In some implementations, tracking the material 140 or re-acquisition of a cut after a shift or material 140 feed can be enabled by the cameras locating reference features on the material 140. Reference features can include, for example, features of the material such as wood grain, previous cuts that are either part of the assembly-process or made using the laser specifically for registration, removable adhesive-backed paper placed on the material 140 to serve as a temporary reference point, etc. To identify motion and rotation of the material through the pass-through slots, cameras can identify marks that are present on the material such as grain structure in wood, natural edges in the material such as corners, marks that are applied to the material such as fiducial marks that are drawn on, marks that are on the material for other purposes such as identification barcodes, and/or marks that are created by the machine itself such as cut lines from a previous machining pass. The cameras can image the reference features during the machining process and adjust the motion plan based on shifts, rotations, or the like, of the reference features. One example can be placing a sticker with a cross on a piece of material 140. If, during machining, the image recognition program determines that the cross rotates 10 degrees, then the motion plan can be recalculated to include compensation for the 10 degree rotation in order to correctly complete the cut. These features can also be applied to machining the oversized material 1810.

Because, in some implementations, the CNC machine 100 can be a laser cutter, the feed of material into or out of the CNC machine 100 can provide an opening for light to escape. For the safety of users, and also to reduce the transfer of contaminates either in or out of the CNC machine 100, there can be one or more light curtains on the CNC machine 100. The light curtains can allow material to go in or out of the CNC machine while keeping a barrier between the inside of the CNC machine 100 where the laser is and the outside. The light curtain can be, for example, a rigid flap mounted with springs, or on a vertical or horizontal track. The light curtain can also include flexible materials that can bend to allow entrance or egress. There can be nested layers of light curtains for additional protection.

Double-Sided Cutting

Figure 19:
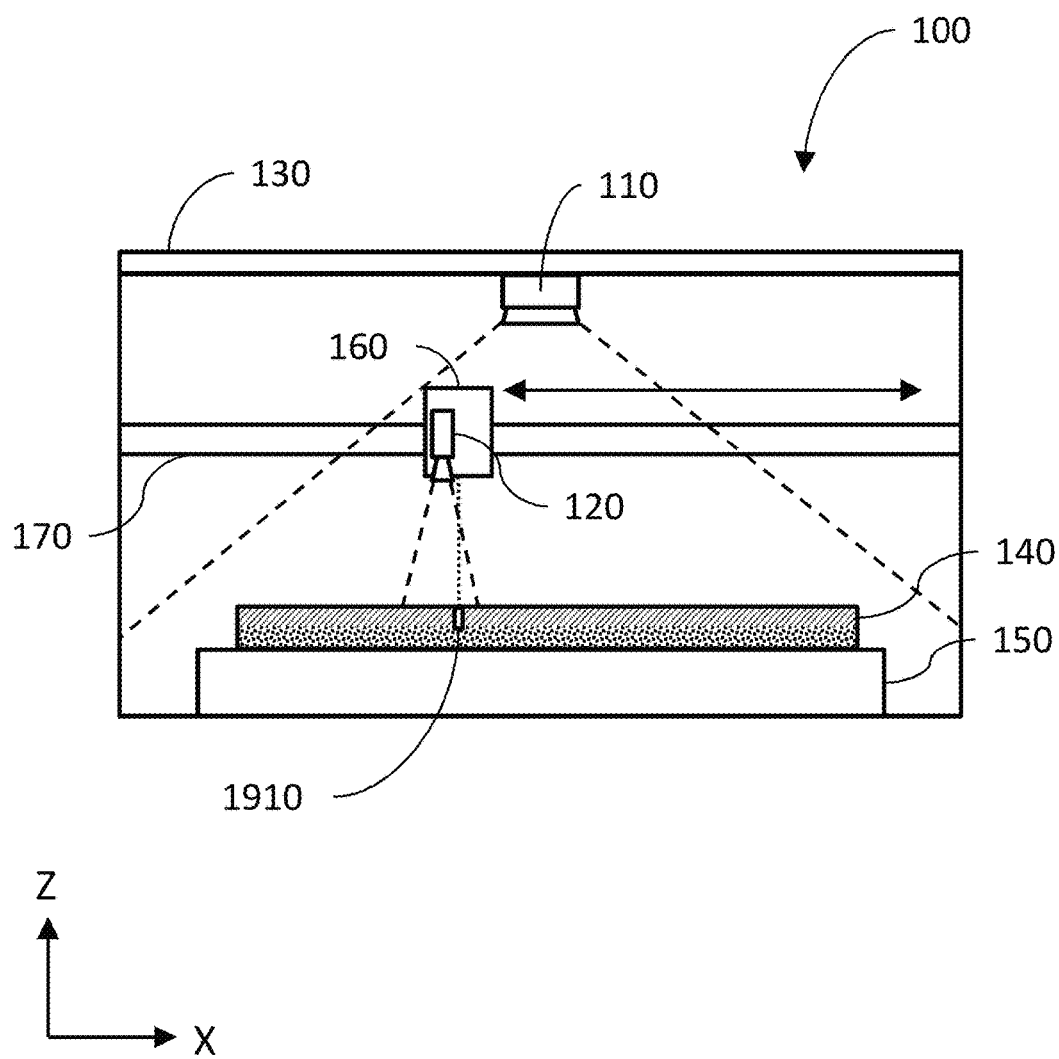
FIG. 19 is a diagram illustrating imaging features of the material to implement double sided cutting, consistent with some implementations of the current subject matter.
Figure 20:
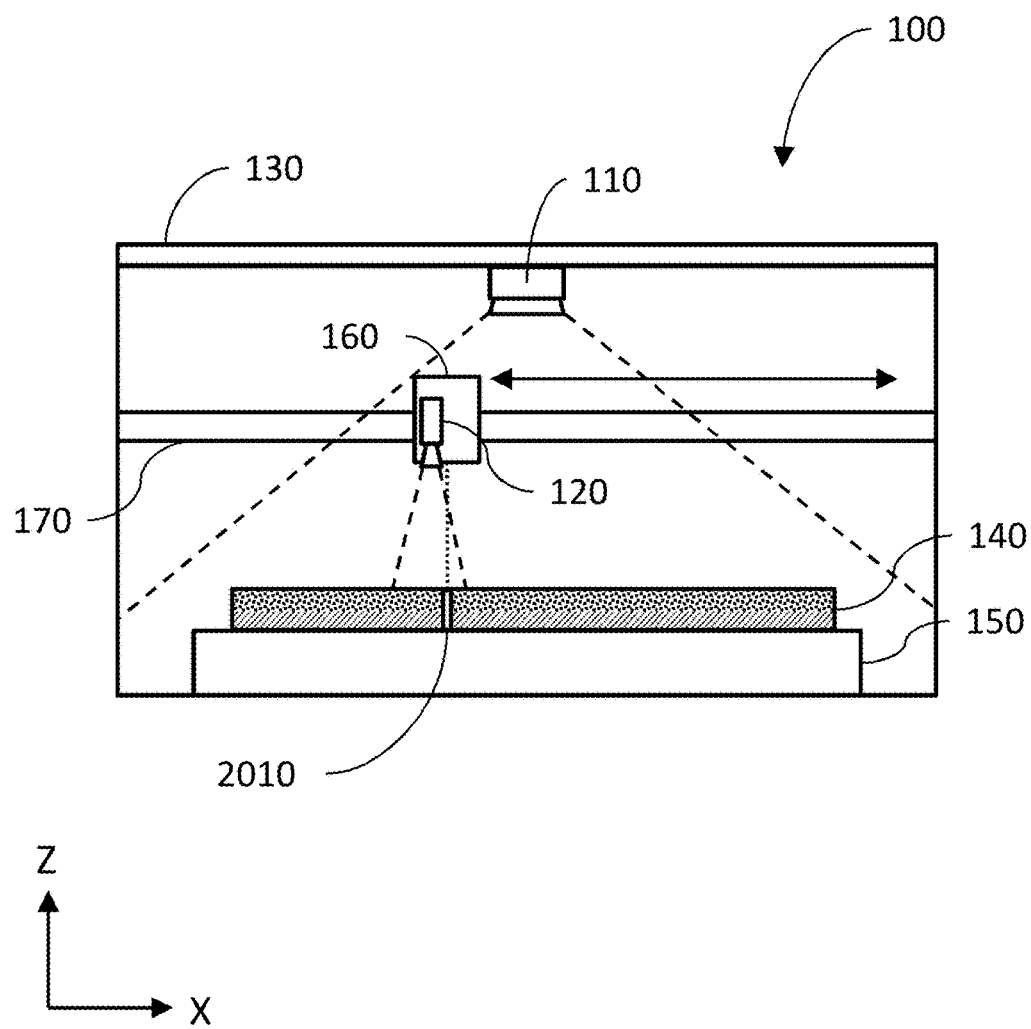
FIG. 20 is a diagram illustrating referencing the imaged features of the material to complete a double-sided cut, consistent with some implementations of the current subject matter.

FIG. 18 is a diagram illustrating imaging features of the material 140 to implement double sided cutting, consistent with some implementations of the current subject matter. FIG. 19 is a diagram illustrating referencing the imaged features of the material 140 to complete a double-sided cut, consistent with some implementations of the current subject matter.

The thicker material is, the more power is required to cut it. For example, a 40 Watt laser may be able to pierce ¼" of maple wood, but no thicker. By flipping the material 140 over, ¼" of thickness may be cut in each side, meaning that material 140 up to ½" thick may be processed. The challenge with double sided cutting is alignment: the cuts must be precisely aligned so that they combine to fully penetrate the material 140.

Image recognition can be advantageously used to improve such a process, for example by instructing the user to flip the material 140 along a known axis and then finding the corners again to align the subsequent cuts. The cameras can detect distinctive features of the material 140, like an irregular edge, a cut through the material 140, corners, edges, and the like, and observe those features when the material 140 is reversed. Though described with regard to double-sided cutting, these features can also be used for double-sided engraving. For example, having an engraved pattern occur in a desired location and/or orientation on both sides of the material 140.

Double-sided cutting can be used with, or independently of, the pass-through features described above. Here, a cut 1810 is performed on one side of the material 140 (as shown in FIG. 18) and then the user, or an automated system, receives an instruction or prompt to flip the material 140 over. Once flipped, the cameras can reacquire reference features, corners, registration marks, cut points, or the like, in a manner similar to that described above with regard to pass-through cutting. As shown in FIG. 19, once the material 140 is referenced, the CNC machine 100 can execute instructions to finish the cut 1910 on the other side of the material 140 in the proper location.

Detecting Features for Double-Sided or Pass-Through Cutting or to Account for Material Re-Positioning The cameras can acquire images (which can be high-resolution images) of one or more features of the material (e.g. registration marks, fiducial marks, previously made cuts or other visible changes to the material) that can be used with, for example, double-sided cutting or pass-through cutting. Imaging of such features using one or more cameras present inside the interior space of the CNC machine can be used to update a position of the material. In other words, the CNC machine 100 can acquire, or re-acquire, the position and orientation of a material 140 after it has been moved either deliberately or inadvertently (e.g. due to the CNC machine being bumped, a user reaching into the interior space and accidentally bumping the material, etc.). The features (which can be but are not limited to registration marks as noted above) can be existing cuts or engravings or other changes caused to the material through the delivery of electromagnetic radiation (e.g. via a moveable head of the CNC machine 100), marks made by a user, registration marks made by the CNC machine 100, fiducial marks made by the CNC machine or otherwise present on the material, one or more corners of the material, one or more edges of the material, one or more holes in the material, etc. While images of the features can be acquired by any camera in the CNC machine 100, in some implementations they can be acquired first by a wide angle and lower resolution camera (e.g. a camera mounted to a lid or other openable barrier) to locate their approximate position, and then again by narrower view, moveable cameras for example the head camera 120 or some other camera that can be moved within the interior space (e.g. on a robotic arm, etc.). High-resolution imaging can have the advantage that the registration marks may be smaller than those that would be usably detectable by a lower-resolution or farther-distant camera.

In some implementations of the current subject matter, the imaging of the material can include more than one image being captured. For example, a first image can be captured by one or more cameras and, based on information obtained from the first image a controller or processor can determine that a second image is needed to properly characterize the material, its position, etc.

In a more specific implementation, the first image in the second image can be captured by two different cameras: a first camera and a second camera. In this example, the first camera can be a wide view camera, for example a camera mounted on the housing of the CNC machine and/or on in openable barrier of the CNC machine. Based on information from an image produced by this first camera, the controller or processor can direct a movable second camera to capture an additional image, perhaps from a closer point of view. In an example in which the second camera is a camera mounted on the movable head of the CNC machine, the controller or processor can cause movement of the movable head to an area near or above a feature that was first imaged by the first camera. As the camera mounted to the movable head may have a higher resolution, or at least may be positioned closer to the feature, the second image can include more detailed information about the feature, thereby allowing a more accurate determination of a proper alignment of the movable head to deliver additional electromagnetic energy to make further changes in the material.

Concurrent Cutting and Thickness Measurement

Any of the techniques described herein for measuring the height of the surface 150 can be performed either before or while cutting or engraving the material 140. For example, a distance finding laser can be directed at, or proximate to, the cutting location in order to determine the material 140 thickness at the cutting point. Most material 140 initially used in a CNC machine 100 is flat or has a flat surface exposed to the laser. However, if the material 140 is not flat, or has been partially engraved and exhibits features of varying depth on the surface, then measuring the local thickness, while executing a cut, can result in a more accurate cut. As another example, material 140 with internal stresses may spring upwards when cut, or cut pieces may drop downwards from warped material 140, changing the focal distance required to make an accurate cut. With a known offset between the measurement point and the intended engraving depth, the motion plan can take into account the measured height that was engraved and adjust the laser output accordingly. Changes to the output can be effected by, for example, moving the head, moving a component in the head, or moving the material 140. The head, while generally confined to a plane parallel to the material 140, can in some implementations move vertically. Components in the head can also be moved, for example moving a lens to vary the distance between the focal point of the lens and the material 140. The material 140 can also move by, for example, material feed, translation or rotation of the material 140, manipulation of the material 140 by a robotic arm, etc.

In another implementation, there can also be a measurement of the thickness after engraving or cutting, which can be used to diagnose errors in the laser operation, material 140 irregularities that were not known before the cut, etc. The measurement can be performed by obtaining a thickness measurement of the material 140 in a location that has previously been cut or engraved. While it can be advantageous to perform the thickness measurements immediately before and/or after the cut, the thickness measurements can be obtained at any time. Once obtained, the measurements can be compared to the motion plan in order to determine whether the chosen speed and power parameters resulted in the desired amount of material 140 removal or to adjust the motion plan ahead of the next pass over the material 140.

Variable Cut Depth

Because the distance between the head 160 and the material 140 is generally fixed, there are a limited number of ways in which cuts of different depth can be made. Three ways of varying the depth of a cut can be, for example, (i) varying the laser power, (ii) reducing the speed with which the laser moves, (iii) varying the focal length of the laser, and (iv) a combination of these.

By varying the laser power, for a given dwell time at a particular location, the depth of the cut can be varied. For example, to a simple approximation, if the laser power is doubled, then in a given time period, twice as much material 140 can be expected to be ablated during the cut. There can be factors which complicate this kind of simple approximation, for example, debris, material 140, etc. One complicating factor is that the power density drops off with distance beyond the focal point, as the deeper material 140 is farther from the lens and thus out of focus.

The focal length of the laser can also be varied in order to provide a constant, or known, power density at a surface with varying height. The focal length of the laser can be varied by adjusting focusing optics inside the head 160 to provide a cut specified by the motion plan. Also, the cameras can monitor a laser's spot size, either the primary cutting laser or a secondary one, as described above, to maintain a specified focal distance for the most precise cutting. Alternatively, the cameras can monitor the spot size during the cut as a measure of the depth of the cut. For example, if it is known that at the focal length a cut was to have a certain depth than the cameras could monitor the spot size to detect that the spot size is reached the expected size given the focal length. Once the spot size is the expected size, then it is known that the cut is a depth defined, in part, by the focal length.

Because the laser power and focal length are generally independent parameters in laser operation, they can be varied together to widen the operating space of the CNC machine 100. In a simple approach without feedback, a first pass may be engraved to a depth of 1 mm by focusing the laser on the surface of the material 140. Then a second pass could be taken removing another 1 mm, this time focusing the lens 1 mm lower at the new top surface of the material 140. In an iterative approach with feedback, there can be multiple passes by the head 160 and after each pass the depth of the cut can be measured by the cameras. The CNC machine 100 can then use the measured change in the material to calculate what combination of power variation and focal length settings are used for the next pass. The calculation can be optimized for the type of material 140, cut time, laser power limits, etc. In one implementation, the average power output of the laser can be set to be below a predefined value. The duty cycle of the laser can be varied to provide alternating periods of the laser being on or off. In one implementation, the duty cycle of the laser can be varied in order to achieve the desired average power output.

Cut Verification

The optical system can image the cut and compare the images with those expected from a cut made on a material 140 with known material 140 properties. The comparison can then be used to determine laser power (or other cutting parameter). The comparison can be based on image features (lightness/darkness of engraving), a through cut that should have been an engraving, etc. Alignment can be confirmed by cutting a pattern that should have a particular shape, imaging the cut, and comparing it to an expected image. The motion plan can be updated to correct for any discrepancies and an alert can be sent to a user or other connected computing system that maintenance of the CNC machine 100 is required. Also, calibration cuts can be used to align one or more elements of the optical system. For example, making a cut pattern of a predefined size and adjusting one or more optical elements to confirm that the field-of-vision of the optical element conforms to the cut pattern.

A cut pattern can be designated to go onto imaged portions of the material 140 based on imaged features of the material 140. The designation can be made by user-input or according to pre-defined instructions. For example, the cameras can determine separate material 140s, colors, textures, etc. present on one or more materials in the CNC machine 100. The motion plan can associate the cut pattern with a particular material 140 or portion of the material 140 based on the imaged features. Once associated, the cut pattern can be executed on the identified portion of the material 140. This can allow, for example, a user to specify a particular cut to go on only certain color portions of a material 140, etc.

Kerf Measurements

Cutting or milling CNC machines remove some material 140 when they cut. The width of the material 140 removed is called the kerf. CNC mills have a kerf that depends on the bit used. Lasers have a very small kerf, on the order of 0.01 inches, but the precise kerf depends on the laser tube, material 140, speed, power setting, environment, and other factors. The width of the kerf also varies from the top of the cut to the bottom, as most cuts are V-shaped with the wider edge towards the laser.

Understanding the dimensions of the kerf is critical to creating accurately fitting pieces. For example, to create a tab and slot, the slot must be reduced in size by half the amount of the kerf, and the tab increased by the same amount. Alternately one can be unchanged and the other can be modified twice as much.

Kerf may be asymmetric, with a wider or narrower kerf for horizontal than vertical. It can also change over the course of a cut, for example if the wood has a knot in it.

Using the cameras to measure the kerf can allow mating parts to be created that fit properly, enabling easier construction of final parts and the creation of 3D structures that would otherwise be impractical or require secondary fasteners to hold together.

To assist with kerf measurement, several techniques can be utilized. The camera can be maneuvered directly over the kerf, as described above. The kerf can be illuminated from below with lighting for the purpose, for example diffuse lighting from below the material 140 or targeted lighting e.g. a focused light or laser pointed at the underside of the material 140 at the location being measured. The kerf can also be measured with a camera from below, looking up at the underside of the material 140. Supplemental lighting on above the material 140 can be used to help make it obvious when the laser has penetrated the material 140, or light emitted from the laser interacting with smoke particles may also serve as illumination.

In one important special case of kerf measurement, the camera may detect that the material 140 was incompletely cut and that some material 140 remains—a zero kerf measurement. In this case, the laser may revisit the area to ensure it cuts fully, and the laser power increased for future cutting to compensate.

As a general technique, it is possible to revisit areas to modify the kerf. If the kerf varies, a small amount of additional material 140 can be removed in a subsequent path to ensure it is consistent. In a related technique, the focus of the beam may be adjusted to remove the lower portion of the kerf, reducing the characteristic V-shape.

Multicolor Engraving

Figure 21:
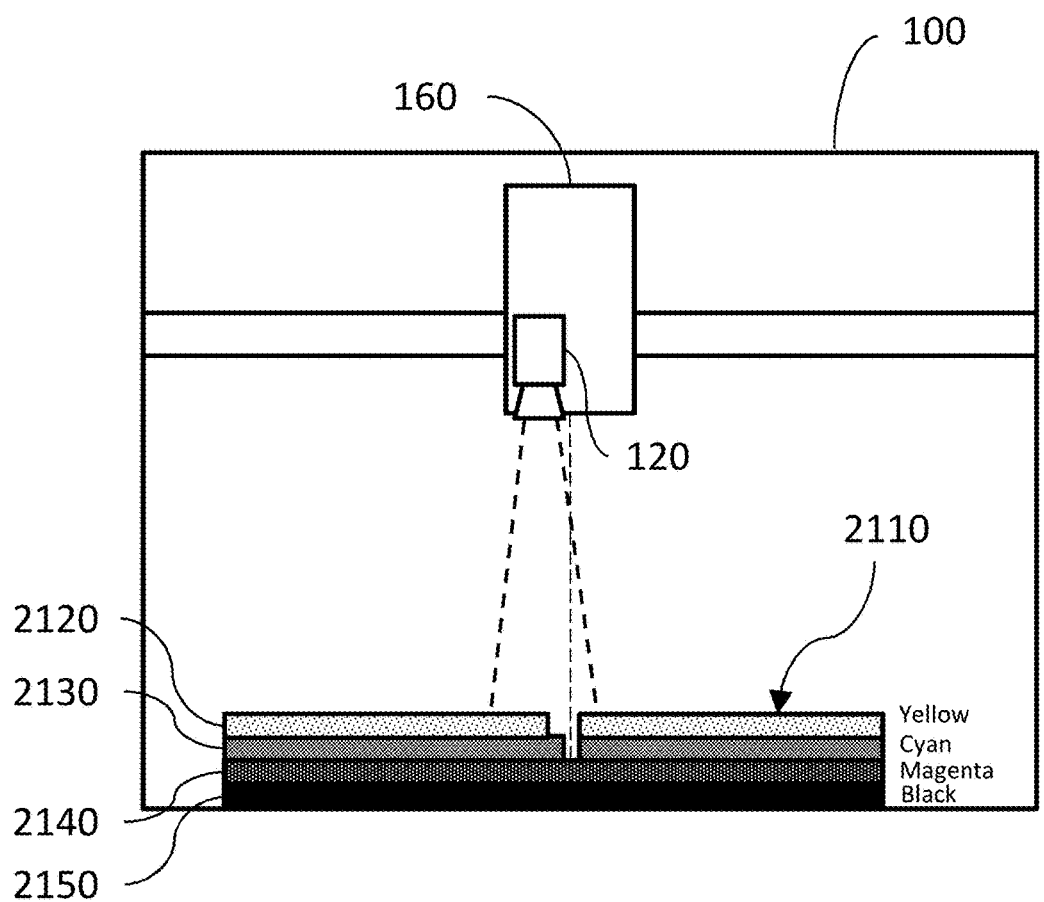
FIG. 21 is a diagram illustrating varying cut depths to generate a color pattern in a multi-layered material.

FIG. 21 is a diagram illustrating varying cut depths to generate a color pattern in a multi-layered material 2110. In one implementation, materials of different color can be layered and cut to a predefined depth to expose a particular color. For example, there can be layers corresponding to the CMYK color model with the layers being cyan, magenta, yellow, and black. Small cuts, or even just spots, can be made to a prescribed depth corresponding to one of the layers by varying laser power, duration of laser exposure, and focus. The depth and density of the cuts can provide a pattern on the material 140 that represents any color combination. Additionally, the cameras, for example the head camera 120, can monitor the exposed colors in order to verify that the cuts are at the depth specified by the motion plan. In the example shown with FIG. 17, the there is a yellow layer 2120, a cyan layer 2130, a magenta layer 2140, and a black layer 2150. Two cuts are shown, one to expose the cyan surface and one to expose the magenta surface. The cuts can be made to form a dot matrix pattern to generate what, at a distance, appears to be a continuous color blend. Other cuts/engravings can be made to expose a color at a particular depth. The inverse process can also be implemented where the cut proceeds until a certain color is exposed, at which time the cut stops. This can provide one method of cutting to a prescribed depth without a priori knowledge of the cutting parameters (power, duration, etc.) to reach the prescribed depth.

Figure 22:
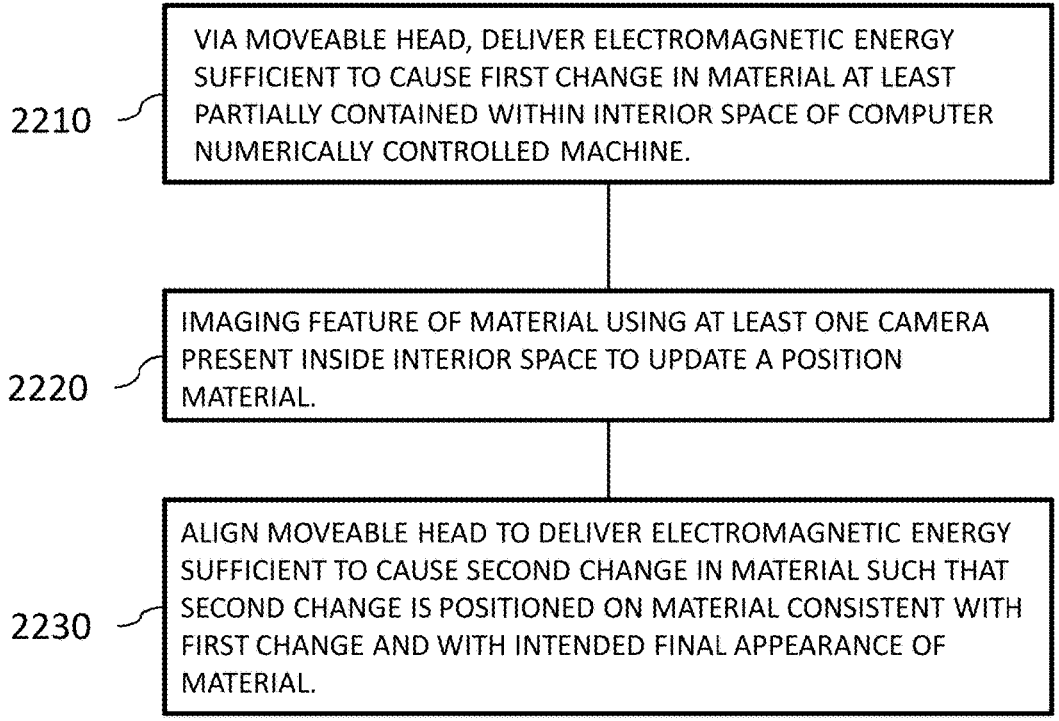
FIG. 22 is a process flow chart illustrating features of a method consistent with implementations of the current subject matter.

FIG. 22 is a process flow chart illustrating features of a method consistent with implementations of the current subject matter. At 2210, electromagnetic energy sufficient to cause a first change in a material at least partially contained within an interior space of a computer numerically controlled machine can be delivered via a moveable head of the computer numerically controlled machine. A feature of the material is imaged at 2220 using at least one camera present inside the interior space to update a position of the material, and at 2230 the moveable head is aligned to deliver electromagnetic energy sufficient to cause a second change in the material such that the second change is positioned on the material consistent with the first change and with an intended final appearance of the material.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
   delivering, via a computer numerically controlled machine, a first electromagnetic energy sufficient to cause a first change in a material at least partially contained within an interior space of the computer numerically controlled machine;
   imaging a feature of the material using at least one camera present inside the interior space to update a position of the material, the feature excluding one or more markings that are predesignated to be recognized as registration patterns; and
   aligning, based at least on the feature, the computer numerically controlled machine to deliver a second electromagnetic energy sufficient to cause a second change in the material such that the second change is positioned on the material consistent with the first change and with an intended final appearance of the material.

2. The computer-implemented method of claim 1, wherein the feature comprises the first change, and wherein the first change forms at least a portion of a pattern included in the intended final appearance of the material.

3. The computer-implemented method of claim 1, wherein the feature comprises an aspect of an appearance of the material.

4. The computer-implemented method of claim 3, wherein the feature comprises a corner of, a hole in, and/or an edge of the material.

5. The computer-implemented of claim 1, further comprising moving the material through a pass-through slot in a housing that at least partially defines the interior space of the computer numerically controlled machine.

6. The computer-implemented of claim 1, wherein the different position results from an unintentional movement of the material.

7. The computer-implemented of claim 6, further comprising determining that the unintentional movement may have occurred based on data from one or more sensors of the computer numerically controlled machine.

8. The computer-implemented of claim 1, wherein the at least one camera comprises a first camera and a second camera, wherein the second camera is moved based at least on information from an image produced by the first camera, and wherein the movement of the second camera at least facilitates further imaging of the material.

9. The computer-implemented method of claim 8, wherein the first camera is mounted on an openable barrier of a housing that at least partially defines an interior space of the computer numerically controlled machine, and wherein the second camera is mounted on a head capable of delivering the first electromagnetic energy and/or the second electromagnetic energy.

10. A computer numerically controlled machine comprising:
    a head inside an interior space of the computer numerically controlled machine, the head capable of delivering electromagnetic energy;
    at least one camera present inside the interior space; and
    a controller configured to perform operations comprising:
      causing the head to deliver a first electromagnetic energy sufficient to cause a first change in a material at least partially contained within the interior space;
      commanding the at least one camera to image a feature of the material to update a position of the material, the feature excluding one or more markings that are predesignated to be recognized as registration patterns; and
      causing alignment of the computer numerically controlled machine to deliver a second electromagnetic energy sufficient to cause a second change in the material, the computer numerically controlled machine being aligned based at least on the feature such that the second change is positioned on the material consistent with the first change and with an intended final appearance of the material.

11. The computer numerically controlled machine of claim 10, wherein the at least one camera comprises a camera mounted on the head.

12. The computer numerically controlled machine of claim 10, wherein the at least one camera comprises a camera not mounted on the head.

13. The computer numerically controlled machine of claim 10, wherein the at least one camera comprises a camera mounted to an openable barrier of a housing that at least partially defines the interior space of the computer numerically controlled machine.

14. The computer numerically controlled machine of claim 10, further comprising: a pass-through slot in a housing that at least partially defines the interior space volume, the pass-through slot accepting the material at a size that cannot be completely enclosed within the interior space and allowing changes to the position of the material to be made.

15. A computer readable medium comprising a non-transitory machine-readable medium storing instructions that, when executed by at least one programmable processor, cause the at least one programmable processor to perform operations comprising:
    delivering, via a computer numerically controlled machine, a first electromagnetic energy sufficient to cause a first change in a material at least partially contained within an interior space of the computer numerically controlled machine;
    imaging a feature of the material using at least one camera present inside the interior space to update a position of the material, the feature excluding one or more markings that are predesignated to be recognized as registration patterns; and aligning, based at least on the feature, the computer numerically controlled machine to deliver a second electromagnetic energy sufficient to cause a second change in the material such that the second change is positioned on the material consistent with the first change and with an intended final appearance of the material.

16. The computer readable medium as in claim 15, wherein the feature comprises the first change, and wherein the first change forms at least a portion of a pattern included in the intended final appearance of the material.

17. The computer readable medium as in claim 15, wherein the feature comprises an aspect of an appearance of the material.

18. The computer readable medium as in claim 17, wherein the feature comprises a corner of, a hole in, and/or an edge of the material.

19. The computer readable medium of claim 15, wherein the at least one camera comprises a first camera and a second camera, and wherein the imaging comprises moving the second camera to facilitate further imaging of the material based information from an image produced by the first camera.

20. The computer readable medium of claim 15, wherein the first camera is mounted on an openable barrier of a housing that at least partially defines the interior space, and the second camera is mounted on a head capable of delivering the first electromagnetic energy and/or the second electromagnetic energy.

21. The computer-implemented method of claim 1, wherein the first electromagnetic energy is delivered without designating the feature to be recognized as a registration pattern.

22. The computer-implemented method of claim 1, wherein the feature excludes one or more changes made to the material for a purpose of aligning the material.

* * * * *